US006637097B2

(12) United States Patent
Miyano

(10) Patent No.: US 6,637,097 B2
(45) Date of Patent: Oct. 28, 2003

(54) SYSTEM AND METHOD FOR PROCESSING ELONGATE WORKPIECES

(76) Inventor: Toshiharu Miyano, 50 Dundee La., Barrington Hills, IL (US) 60010

( * ) Notice: Subject to any disclaimer, the term of this patent is extended or adjusted under 35 U.S.C. 154(b) by 0 days.

(21) Appl. No.: 09/946,646

(22) Filed: Sep. 4, 2001

(65) Prior Publication Data
US 2002/0073531 A1 Jun. 20, 2002

Related U.S. Application Data

(63) Continuation-in-part of application No. 09/633,519, filed on Aug. 7, 2000.

(51) Int. Cl.⁷ .............................................. B23Q 41/00
(52) U.S. Cl. ........................ 29/564; 29/27 C; 29/27 R; 29/563; 29/33 P; 414/280; 82/124; 82/1.11
(58) Field of Search ................ 29/27 C, 27 R, 29/563, 564, 33 P; 414/280, 751.1, 18; 82/124, 127, 129, 1.11

(56) References Cited

U.S. PATENT DOCUMENTS 1,673,088 A * 6/1928 Potter ........................ 29/27 R
3,913,751 A * 10/1975 Friedman .................... 414/680
4,143,534 A * 3/1979 Hartkopf et al. ............... 72/98
4,292,864 A * 10/1981 Cucchi et al. ................ 82/126
4,654,954 A * 4/1987 Bayes et al. .................. 483/40
5,626,454 A * 5/1997 Tokiwa et al. ............... 414/280

FOREIGN PATENT DOCUMENTS

DE 3420531 * 12/1985 ................. 29/27 R
JP 410296576 A * 11/1998 ................. 414/280

* cited by examiner

Primary Examiner—A. L. Wellington
Assistant Examiner—Dana Ross
(74) Attorney, Agent, or Firm—Wood, Phillips, Katz, Clark & Mortimer

(57) ABSTRACT

A system for processing elongate workpieces. The system consists of a first machining unit for performing a first processing operation on an elongate workpiece that is situated at a first location and a second machining unit for performing a second processing operation on an elongate workpiece that is situated at a second location that is vertically spaced from the first location. The system further consists of a first supply unit on which a plurality of elongate workpieces can be placed in a stored position. A transfer assembly engages an elongate workpiece in a stored position and selectively delivers an elongate workpiece engaged by the transfer assembly to one of the first and second locations.

36 Claims, 14 Drawing Sheets

SYSTEM AND METHOD FOR PROCESSING ELONGATE WORKPIECES

This is a Continuation-in-Part application of Ser. No. 09/633,519, entitled "Machine Tool Assembly and Method of Performing Machining Operations Using the Machine Tool Assembly", filed Aug. 7, 2000.

BACKGROUND OF THE INVENTION

1. Field of the Invention

This invention relates to machining units for performing machining operations on a workpiece and, more particularly, to a system for processing elongate workpieces utilizing a plurality of the machining units. The invention is also directed to a method for processing elongate workpieces utilizing the system.

2. Background Art

In machining facilities, it is desirable to have the capability to perform multiple machining operations in an efficient manner while minimizing space requirements for the machining equipment. Typically, machine tool assemblies/machining units are arranged on a floor on one level. Most commonly, the machine tool assemblies are oriented horizontally. Floor space planning is carried out with the understanding that the footprint of each horizontally situated machine tool assembly will dictate the amount of floor space required for a particular machine tool assembly. Space above the footprint that is not occupied by the machine tool assembly is for all practical purposes wasted space.

It is known to orient machine tool assemblies vertically to better utilize vertically available space. One example of such an arrangement is shown in my U.S. Pat. No. 6,081,986. While this arrangement does make a better utilization of vertical space, there are drawbacks with this arrangement. First of all, some machine tool assemblies may be more prone to deformation if oriented in other than a horizontal direction. That is, many systems are configured in a pyramidal construction so that stability and accuracy are maintained by building components with decreasing mass from the base up. The vertical orientation of this type of machine tool assembly may cause the misalignment of cooperating components that could detract from system performance.

As with horizontal systems, the space above the vertically oriented individual machine tool assemblies is for all practical purposes wasted.

While ideally many machining operations are performable simultaneously under one roof, the number of such operations is generally limited by the surface area of a floor on which the machine tool assemblies are supported.

SUMMARY OF THE INVENTION

In one form, the invention is directed to a system for processing elongate workpieces. The system consists of a first machining unit for performing a first processing operation on an elongate workpiece that is situated at a first location and a second machining unit for performing a second processing operation on an elongate workpiece that is situated at a second location that is vertically spaced from the first location. The system further consists of a first supply unit on which a plurality of elongate workpieces can be placed in a stored position. A transfer assembly engages an elongate workpiece in a stored position and selectively delivers an elongate workpiece engaged by the transfer assembly to one of the first and second locations.

In one form, the transfer assembly includes a shuttle assembly which is vertically movable between a first position, from where an elongate workpiece on the shuttle assembly can be delivered to the first location, and a second position, from where an elongate workpiece on the shuttle assembly can be delivered to the second location.

The transfer assembly may further include a first loading unit for directing the elongate workpieces from the stored position to a holding position on the shuttle assembly.

The shuttle assembly may further include an elongate workpiece holder that is repositionable between a conveying position and a first transfer position.

The system may include a first guide surface to which an elongate workpiece in the holding position can be delivered and guided toward the first location with the shuttle assembly in the first position. The first guide surface may decline toward the first location.

In one form, the elongate workpiece holder consists of at least one surface which defines a receptacle for an elongate workpiece in the holding position with the workpiece holder in the conveying position and which guides movement of the elongate workpiece in the holding position onto the first guide surface as an incident of the workpiece holder changing from the conveying position toward the first transfer position.

The elongate workpiece holder may be pivotable between the conveying and transfer positions.

The system may further include a third machining unit for performing a third processing operation on an elongate workpiece that is at a third location spaced from the first and second locations.

In one form, the elongate workpiece holder is repositionable to a second transfer position. The system includes a third guide surface with the at least one surface on the elongate workpiece holder guiding movement of an elongate workpiece in the holding position onto the third guide surface as an incident of the workpiece holder changing from the conveying position toward the second transfer position.

The first and third locations may be at substantially the same height.

The system may further include a guide assembly for guiding vertical movement of the shuttle assembly between the first and second positions.

In one form, the loading unit consists of a pickup shoulder that is moveable between a pickup position and a release position, with the pickup shoulder engaging an elongate workpiece in the stored position and causing movement of an elongate workpiece in the stored position toward the elongate workpiece holder as an incident of the pickup shoulder moving from the pickup position toward the release position.

The shoulder may be pivotable between the pickup and release positions.

In one form, the supply unit consists of an inclined feeding surface along which elongate workpieces are urged by gravitational force toward a pickup location.

In one form, the first loading unit has a blocking surface which blocks movement of an elongate workpiece into the pickup location as the pickup shoulder is moved with a workpiece from the pickup position into the release position.

In one form, there is a stop shoulder at the first guide surface to which an elongate workpiece moving downwardly along the first guide surface abuts to maintain the elongate workpiece which has moved downwardly along the first guide surface consistently in a predetermined position against the stop shoulder.

In one form, the transfer assembly includes a first guide surface which is inclined so as to guide elongate workpieces from the first supply unit toward the first location and a second guide surface which is inclined so as to guide elongate workpieces from the first supply unit toward the second location.

With the shuttle assembly in the first position, a workpiece thereon can be delivered to against the first guide surface for movement thereagainst under gravitational force toward the first location. With the shuttle assembly in the second position, an elongate workpiece thereon can be delivered to against the second guide surface for movement thereagainst under gravitational force toward the second location.

The system may further include a pusher assembly for directing a workpiece into operative relationship with the first machining unit.

In one form, the first machining unit has a rotary operating axis and the pusher assembly pushes an elongate workpiece in a line that is substantially coincident with the rotary operating axis.

The system may include at least one elongate workpiece in a stored position on the first supply unit.

The invention is also directed to a method for processing elongate workpieces, including the steps of: storing a plurality of elongate workpieces on a first supply unit; delivering a first elongate workpiece from the first supply unit to a first location; performing a first processing operation on the first elongate workpiece at the first location; delivering a second elongate workpiece from the first supply unit to a second location that is vertically spaced from the first location; and performing a second processing operation on the second elongate workpiece at the second location.

The method may further include the steps of removing the first elongate workpiece from the first supply unit and blocking removal of another of the plurality of elongate workpieces from the first supply unit.

The step of delivering the first elongate workpiece may involve delivering the first elongate workpiece to against a first inclined guide surface so that the first elongate workpiece moves against the first inclined guide surface under the force of gravity toward the first location.

The step of delivering the second elongate workpiece may involve delivering the second elongate workpiece to against a second inclined guide surface so that the second elongate workpiece moves against the second inclined guide surface under the force of gravity toward the second location.

The step of storing a plurality of elongate workpieces may involve storing a plurality of workpieces on an inclined feeding surface so that the plurality of elongate workpieces are urged by gravitational forces into an accumulated state, one against the other.

The method may further include the steps of guiding the first elongate workpiece from the first supply unit to a first workpiece holder.

The method may further include the step of repositioning the first workpiece holder to thereby direct the first elongate workpiece from the first workpiece holder toward the first location.

The method may further include the steps of directing a third elongate workpiece from the first supply unit to the first workpiece holder and repositioning the first workpiece holder to thereby direct the third elongate workpiece from the first workpiece holder toward a third location.

The method may further include the steps of delivering a third elongate workpiece to the third location and at the third location performing a third processing step on the third elongate workpiece.

The method may include the steps of directing the first elongate workpiece past the first workpiece holder to a second workpiece holder and repositioning the second workpiece holder to thereby direct the first elongate workpiece from the second workpiece holder toward the first location.

The method may include the steps of directing a third elongate workpiece past the first workpiece holder to a second workpiece holder and repositioning the second workpiece holder to thereby direct the third elongate workpiece from the second workpiece holder toward a third location.

The method may include the steps of placing the first workpiece holder in a holding state, directing the first elongate workpiece into a holding position on the first workpiece holder, changing the first workpiece holder from the holding state into a release state, and repositioning the first workpiece holder so that with the first workpiece holder in the release state the first elongate workpiece is directed toward the first location.

The method may include the steps of placing the first workpiece holder into a release state and guiding a third elongate workpiece through the first workpiece holder to a holding position on the second workpiece holder.

The method may further include the step of repositioning the second workpiece holder to thereby direct the third elongate workpiece toward a third location.

BRIEF DESCRIPTION OF THE DRAWINGS

FIG. 19 is a fragmentary, end elevation view of a modified form of transfer assembly, according to the present invention, for picking up workpieces from a supply unit and delivering the same to machining units;

FIG. 20 is a fragmentary, end elevation view of a gate system for controllably releasing workpieces from a feeding surface on a supply unit on which a plurality of workpieces are stored;

FIG. 21 is an end elevation view of a system for processing elongate workpieces and including a modified form of transfer assembly, according to the present invention;

DETAILED DESCRIPTION OF THE DRAWINGS

Figure 1:
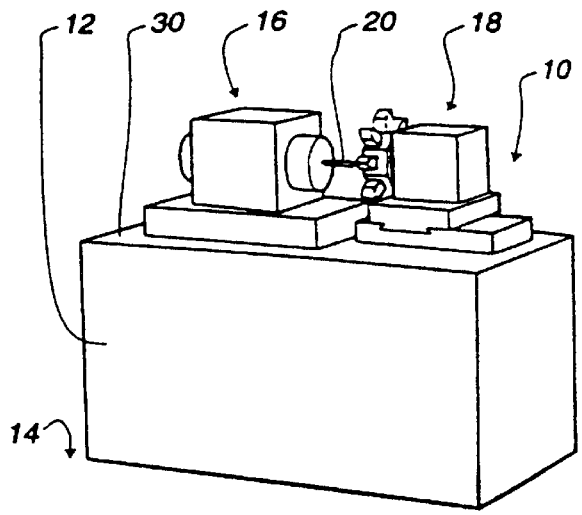
FIG. 1 is a perspective view of a conventional machine tool assembly.
Figure 2:
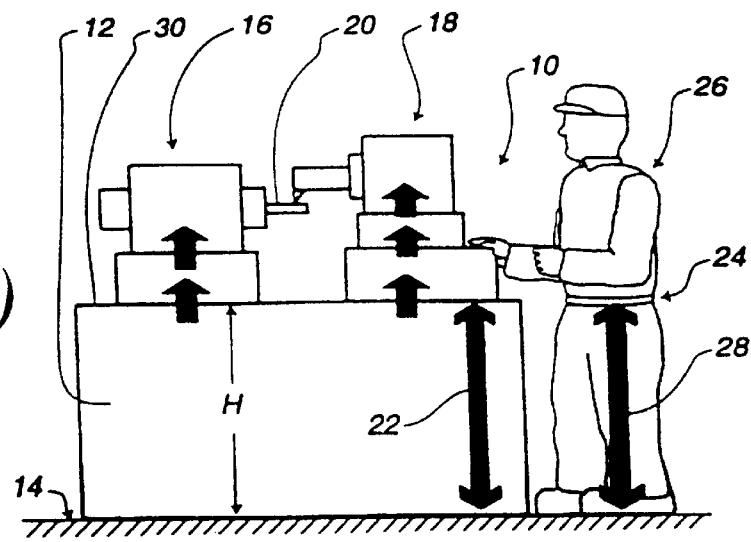
FIG. 2 is a side elevation view of the machine tool assembly of FIG. 1.
Figure 3:
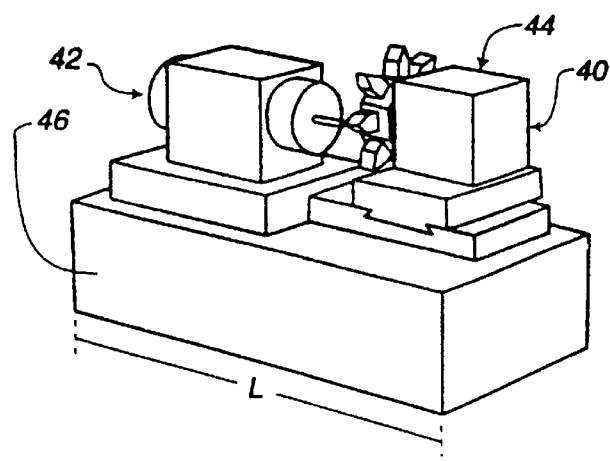
FIG. 3 is a perspective view of a machine tool assembly according to the present invention.
Figure 4:
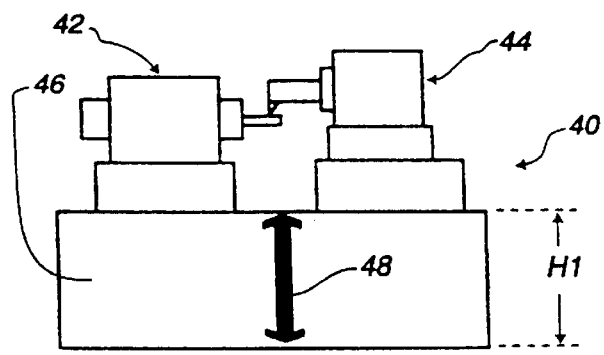
FIG. 4 is a side elevation view of the machine tool assembly of FIG. 3.

Referring initially to FIGS. 1 and 2, a conventional, machine tool assembly is shown at 10 and consists of a base 12 which is supported on a subjacent surface 14. The base 12 in turn supports a machining unit consisting of cooperating machine tool components, in this case a workpiece holder 16 and a machining unit 18 which cooperate to perform a machining operation on a workpiece 20.

Conventionally, the height of the base 12, as indicated by the double-headed arrow 22, is selected to approximate the height of the waist region 24 of an operator 26, as indicated by the double-headed arrow 28. The vertical dimension H may be on the order of 30 inches or more. Typically, the machine tool assembly 10 is constructed in a pyramidal fashion, with the components stacked serially, one on top of the other and upon the base 12, with the stacked components decreasing in mass from bottom to top. The base 12 has a plan profile, in this case defined by the perimeter of an upwardly facing support surface 30, that is significantly larger than the combined footprint for the workpiece holder 16 and machining unit 18. By building the components in this manner, structural stability is sought so as to maintain alignment between the workpiece holder 16 and machining unit 18. At the same time the mass of the base 12 is dictated by the height requirements to situate the workpiece holder 16 and machining unit 18 at the waist region of the operator 26.

The drawback with the large mass of the base 12 is that the base 12 becomes prone to deformation as it is heated during machining operations. While the large size base 12 does give structural stability, it is also more prone to thermal deformation, which may compromise the alignment between the workpiece holder 16 and machining unit 18.

In FIGS. 3–8, one form of machine tool assembly, according to the present invention, is shown at 40. The machine tool assembly consists of a machining unit consisting of a workpiece holder 42 and a machining component 44 which are supported in operative relationship by a primary base 46. The primary base 46 may have the same footprint as the base 12, previously described with respect to the machine tool assembly 10, but has a vertical dimension H1, indicated by the double-headed arrow 48, that is less than the height H of the base 12. For example, the height H1 of the primary base 46 may be on the order of 24 inches or less.

It should be understood that the particular machining components shown are only exemplary in nature. The inventive concept can be practiced with virtually any type of machine tool components capable of performing any machining operation.

Figure 8:
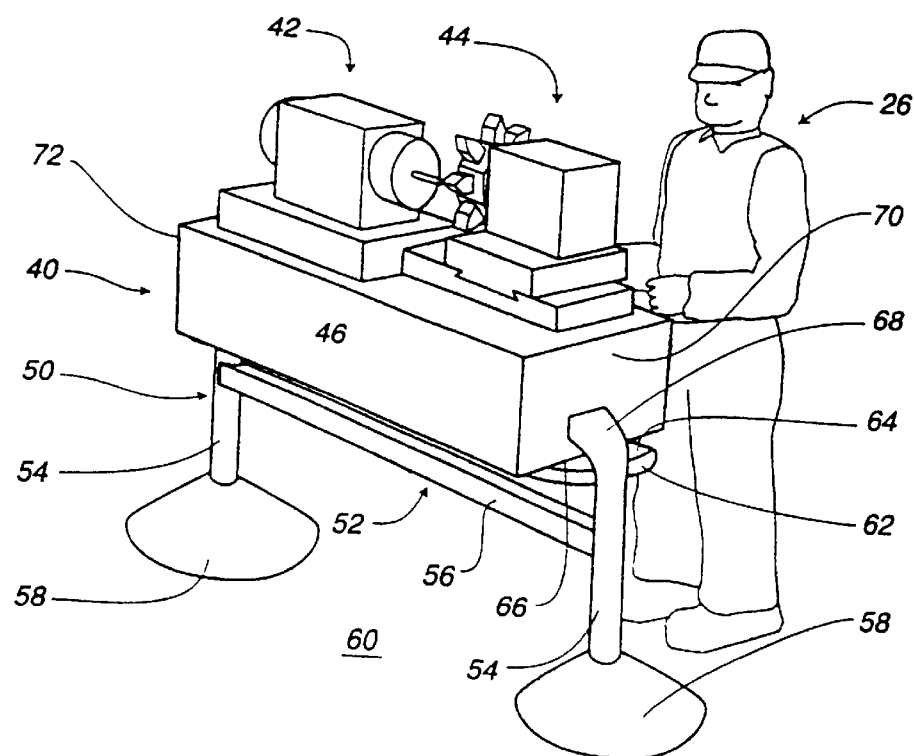
FIG. 8 is a perspective view of a still further modified form of base, according to the present invention, with a machine tool assembly as in FIGS. 3 and 4 in an operative position thereon.

In one form, the machine tool assembly 40, as seen in FIG. 8, can be supported upon a secondary base 50 which includes a frame 52 consisting of uprights 54 united by a horizontal cross piece 56. Each upright 54 has an enlarged bottom 58 which bears on a subjacent support surface 60. A platform element 62 defines an upwardly facing surface 64 to bear on a bottom surface 66 of the primary base 46. With the primary base 46 supported on the surface 64, inturned ends 68 of the uprights 54 engage, one each, with an end wall 70, 72 on the primary base 46 for purposes of stability.

With this arrangement, the mass of the primary base 46 can be reduced to make it less susceptible to thermal deformation. By reason of using the secondary base 50, the machine tool assembly 40 can be situated at a comfortable height for the user 26.

Figure 5:
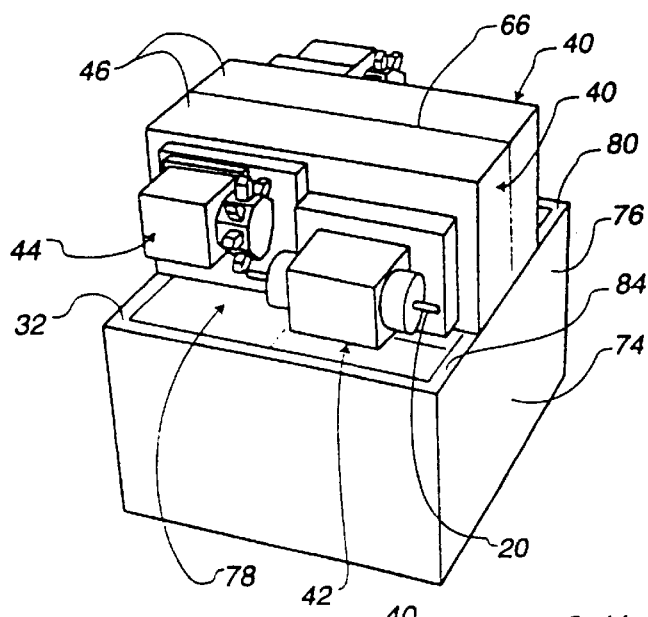
FIG. 5 is a perspective view showing two of the machine tool assemblies of FIGS. 3 and 4 operatively mounted upon one form of base, according to the present invention.

The low profile machine tool assembly 40 lends itself to various different stacking arrangements. In FIG. 5, two of the machine tool assembles 40 are shown with their bottom surfaces 66 facially abutted to each other. The abutted machine tool assemblies 40 can in turn be placed upon a secondary base 74 having a peripheral wall 76 bounding a receptacle 78 for collection of machining lubricant and/or particles removed from the workpieces 20 during a machining operation. The peripheral wall 76 has an upwardly facing surface 80 with spaced, parallel surface portions 82, 84 dimensioned to be spanned by the length L (FIG. 3) of the primary base 46. Accordingly, two of the machine tool assemblies 40 can be compactly situated relative to each other upon a single secondary base 74.

Figure 6:
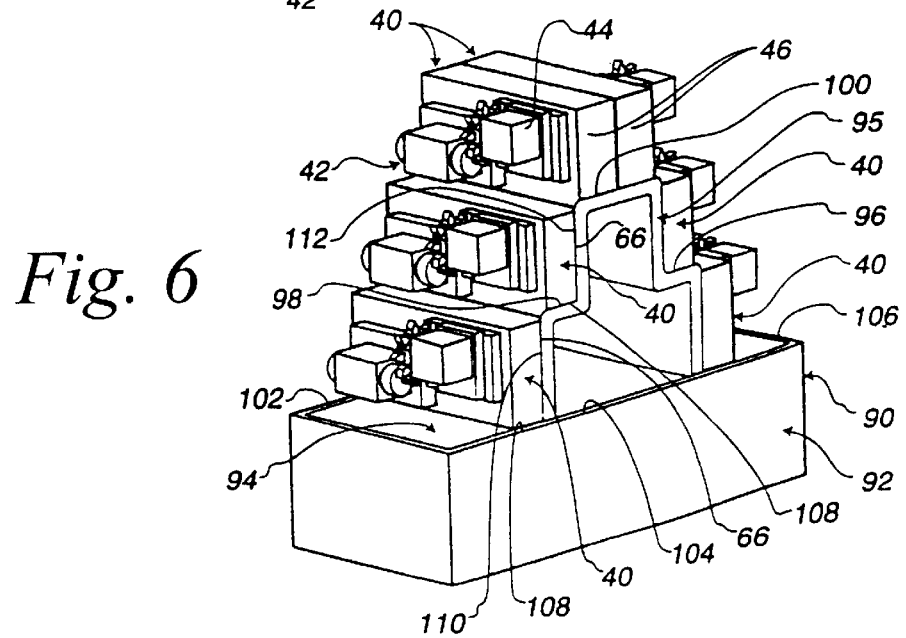
FIG. 6 is a reduced, perspective view of a modified form of base, according to the present invention and with a plurality of machine tool assemblies as in FIGS. 3 and 4 mounted thereto in an operative position.

In FIG. 6, a modified form of secondary base is shown at 90 for supporting a plurality of the machine tool assemblies 40 in spaced relationship, both in horizontal and vertical directions. The base 90 consists of a peripheral wall which opens upwardly to define a receptacle 94 for lubricant and/or particles removed from workpieces during the machining process.

The secondary base 90 further includes a frame 95 with a stepped configuration, thereby defining lower, substantially parallel, support surfaces 96, 98 and an upper support surface 100 spaced above the support surfaces 96, 98. The frame 95 spans parallel, spaced surface portions 102, 104 of an upwardly facing surface 106 at the top of the peripheral wall 92.

The machine tool assemblies 40 are stacked in an operative position at each side of the frame 95 in like fashion. On one exemplary side of the frame 95, the lowermost machine tool assembly is situated so that the side surface 108 spans, and is supported by, the surface portions 102, 104 on the peripheral wall 92 with the bottom surface 66 facially abutted to an upwardly extending surface 110 on the frame 95.

The superjacent machine tool assembly 40 has its side surface 108 abutted to the support surface 98 and its bottom surface 66 abutted to an upwardly extending surface 112 on the frame 95. Two of the machine tool assemblies 40 are abutted as in FIG. 5 and supported on the surface 100 at the top of the frame 95.

With this arrangement, there is an efficient utilization of space vertically above the lowermost machine tool assemblies 40. With a staggered horizontal arrangement, the machine tool assemblies 40 may be in partial vertical coincidence. A single receptacle 94 defined by the peripheral wall 92 may be used for the multiple machine tool assemblies 40.

Figure 7:
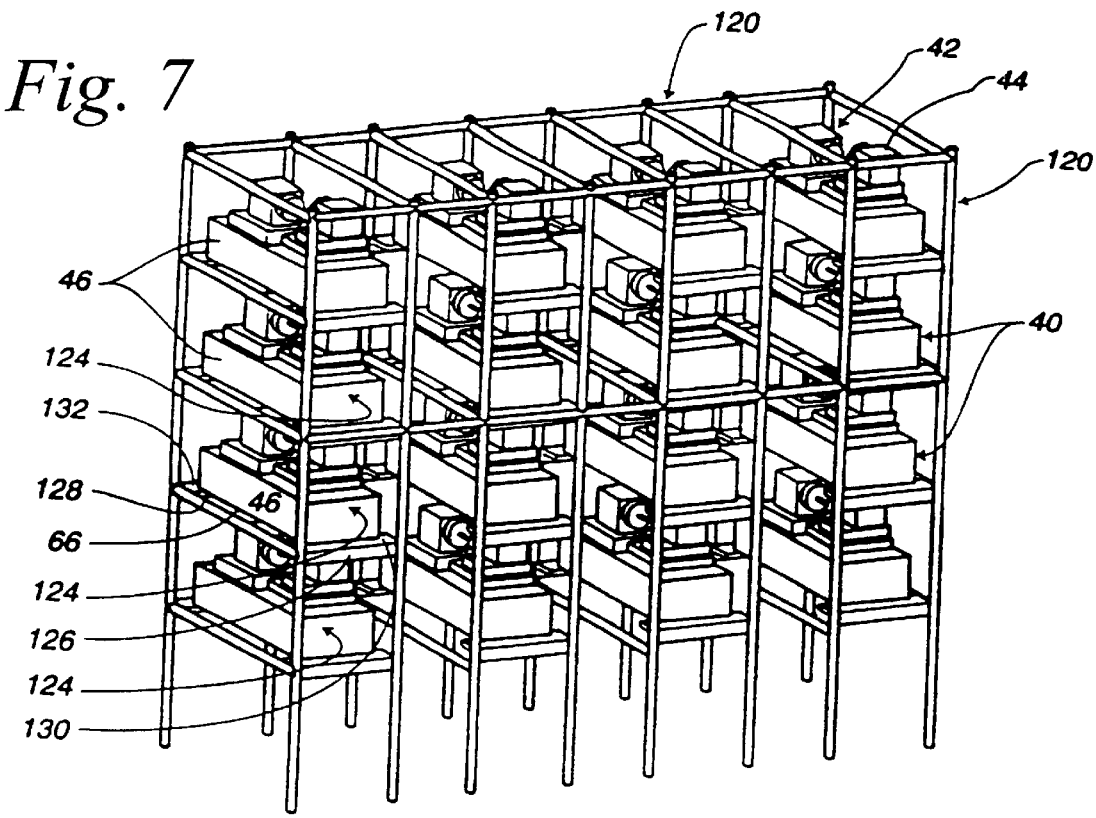
FIG. 7 is a reduced, perspective view of a further modified form of base, according to the present invention, with a plurality of machine tool assemblies as in FIGS. 3 and 4 in an operative position thereon.

In FIG. 7, a modified form of secondary base is shown at 120 and consists of at least one frame 122 which defines a series of horizontally and vertically spaced compartments 124, each designed to receive a machine tool assembly 40 either in a normal horizontal relationship or with the machine tool assembly 40 reoriented from the horizontal position shown. The frame 122 can be made from tubular material or other material, with each compartment including spaced platform elements 126, 128, each having an upwardly facing surface 130, 132, which surfaces are bridged by the bottom surface 66 of the primary base 46. The ends of the compartments 124 are each bounded by a part of the frame 122 that extends fully around an operating axis for the machine tool assembly 40 therewithin.

In FIGS. 9–12, the invention is described with respect to a modified form of machine tool assembly, the details of which are described in a separate, application, Ser. No. 09/633,519, filed Aug. 7, 2000, which is incorporated herein by reference. Briefly, as seen most clearly in FIG. 9, the machine tool assembly 140 consists of a caged module defined by a series of end supports 142, 144, 146, 148 which are united by bar-shaped, elongate, parallel, reinforcing elements 150, 152, 154, 156, each of which extends fully through, and is connected to, the end supports 142, 144, 146, 148. Between adjacent end supports 142, 144, 146, 148 are a series of compartments/working spaces 158, 160, 162, within which a machining unit, consisting of machine tool components, 164 can be mounted. Again, the particular nature of the machining unit is not critical to the present invention, as the inventive concept can be used with virtually any type of machine tool configuration.

Figure 9:
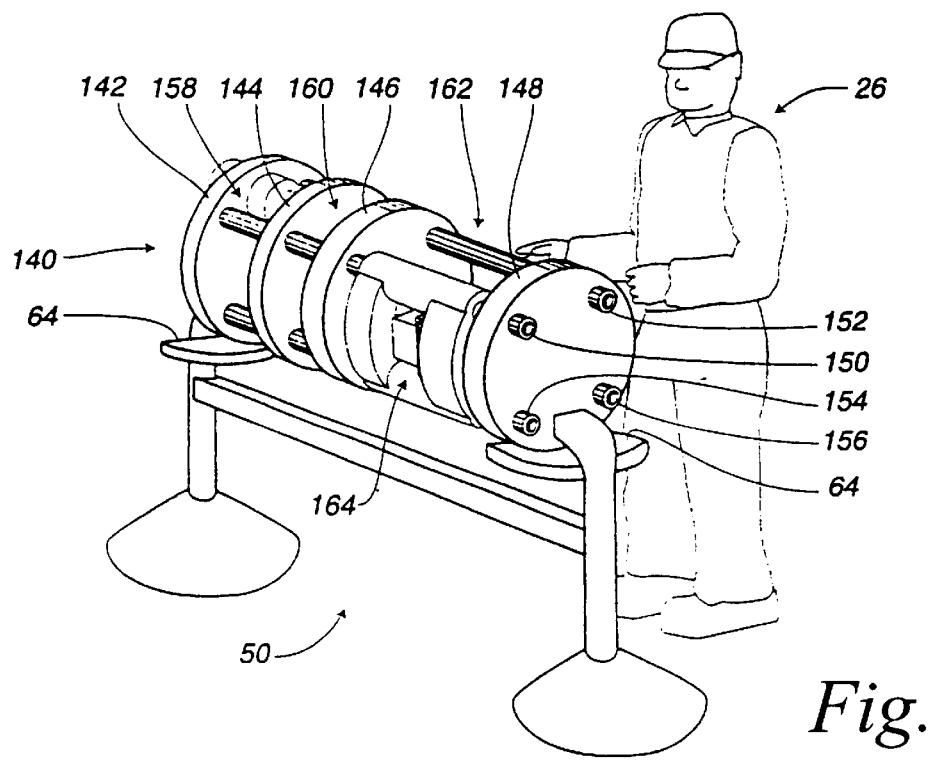
FIG. 9 is a view as in FIG. 8 with a modified form of machine tool assembly, according to the present invention.

In FIG. 9, the machine tool assembly 140 is shown mounted to the secondary base 150, previously described. The end supports 142, 148 are spaced to bear against the upwardly facing platform surface 64.

Figure 11:
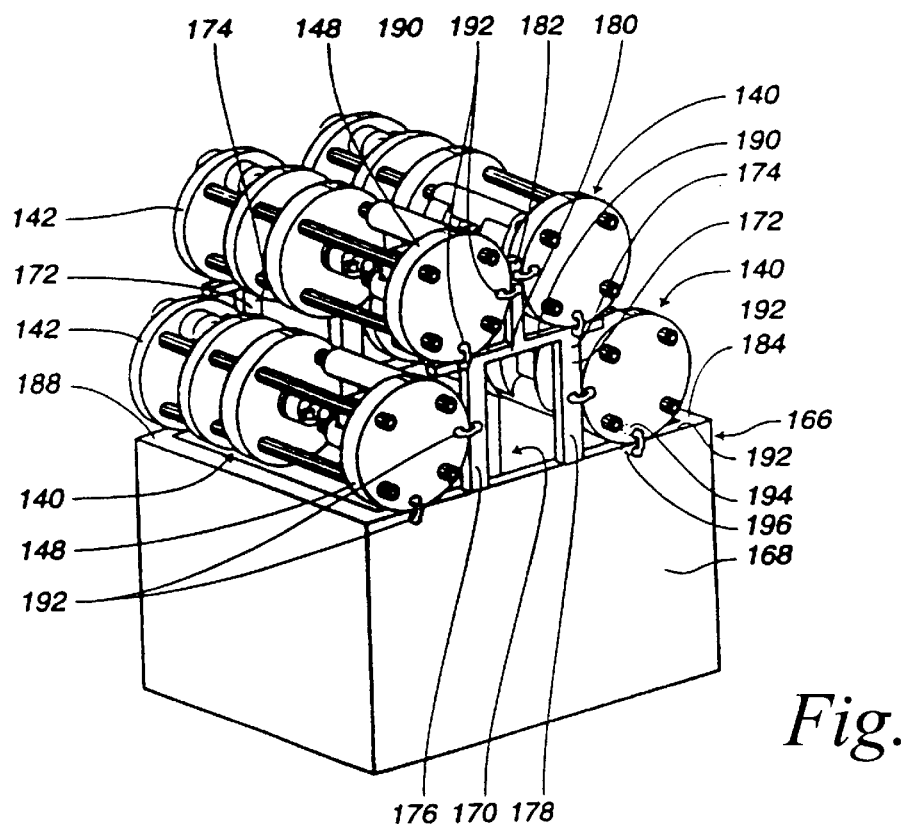
FIG. 11 is a perspective view of a modified form of base, according to the present invention, with a plurality of modules as in FIG. 9 operatively connected thereto.

In FIG. 11, a plurality of machine tool assembles 140 are shown mounted to a secondary base 166 which includes a peripheral wall 168 bounding a receptacle 170 for the collection of lubricant and/or particles removed from workpieces by machining. The secondary base 166 includes a frame 172 with spaced frame parts 174 of like construction. Each frame part 174 consists of spaced uprights 176, 178 joined by a cross piece 180. A single upright 182 projects vertically from the horizontal center of the cross piece 180. The uprights 176, 178 are supported on an upwardly facing surface 184 at the top of the peripheral wall 168. The uprights 176,178 on each frame part 174 are supported on parallel, spaced, surface portions 186, 188 which are spaced from each other a distance equal to the spacing between the endmost end supports 142,148 on each machine tool assembly 140.

Accordingly, two machine tool assembly modules 140 are supported on the surface portions 186, 188 through the end supports 142, 148, which are abuttable thereto. Each of these machine tool assemblies 140 is abuttable, one each, to the uprights 176, 178.

The cross pieces 180 have upwardly facing surfaces 190 to each engage one of the end supports 142, 148 to support the machine tool assemblies 140 at each side of the uprights 182.

Removable connectors 192, each having a U shape with projecting legs 194, 196, are useable to anchor the machine tool assemblies 140 to the secondary base 166. As shown, the connectors 192 are pressed into registrable openings in the end supports 142,148 on the lowermost machine tool assemblies 140 and in the peripheral wall 168 and uprights 176,178. Like connectors 192 are used to connect the end supports 142, 148 on the uppermost machine tool assemblies 140 to the cross piece 180 and upright 182.

Figure 12:
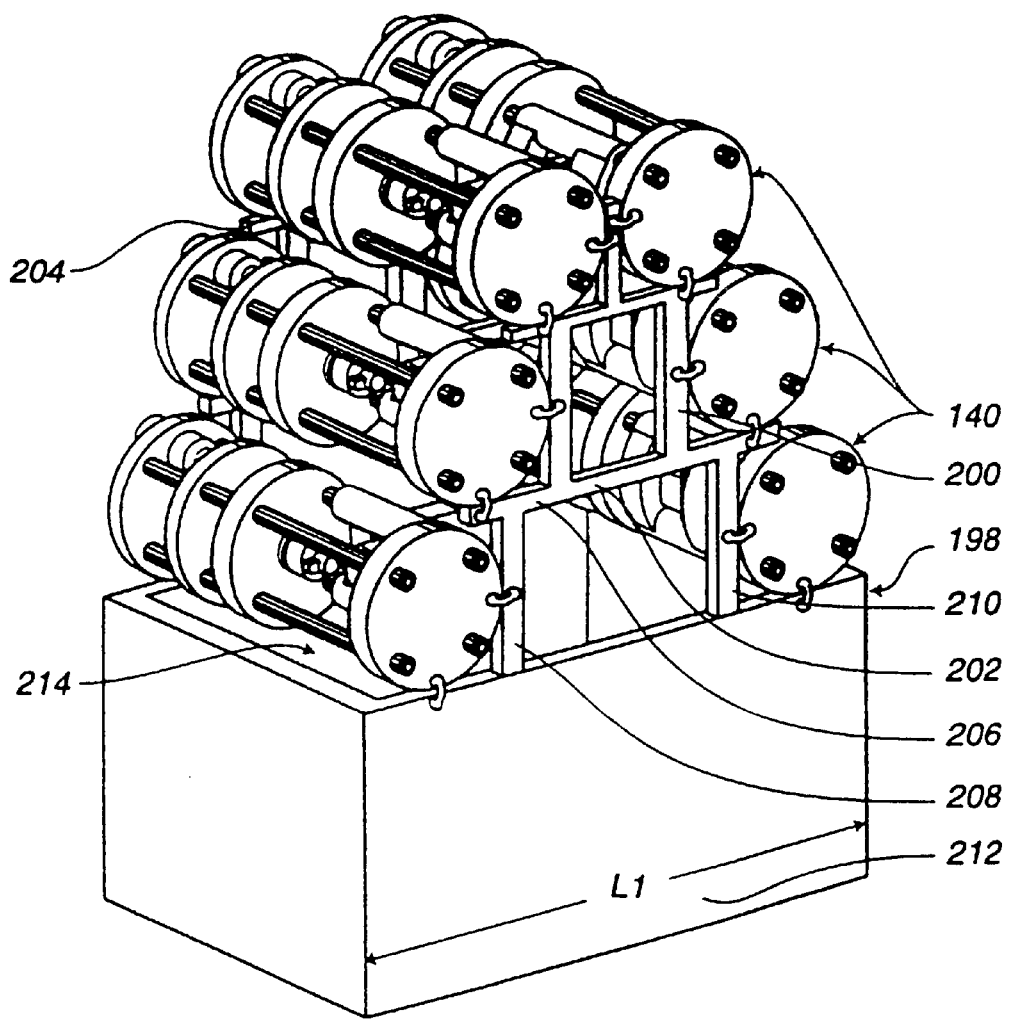
FIG. 12 is a perspective view of a still further modified form of base, according to the present invention, with a plurality of modules as in FIG. 9 in an operative position thereon.

In FIG. 12, a modified form of secondary base is shown at 198. The secondary base 198 has the same general construction as the secondary base 166 with the exception that a frame 200 has frame parts 202, 204 with an additional cross piece 206 and additional depending uprights 208, 210 which thereby produce an additional step for the inclusion of two additional machine tool assemblies 140. The length L1 of the peripheral wall 212 defining a receptacle 214 for lubricant/particles from machined workpieces is extended to accommodate the additional machine tool assemblies 140.

Figure 10:
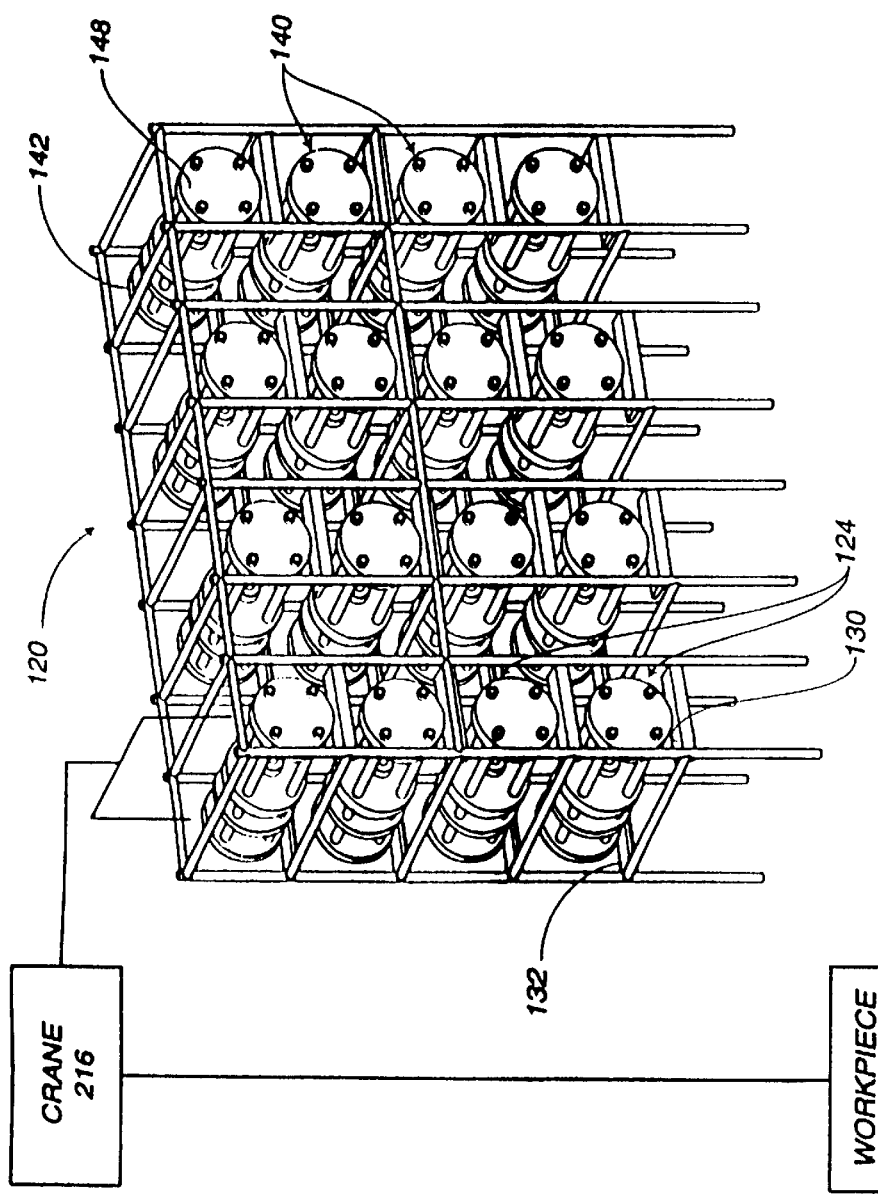
FIG. 10 is a reduced, perspective view of a base as in FIG. 7 with a plurality of machine tool assemblies as in FIG. 9 in an operative position thereon.

In FIG. 10, the secondary base 120, previously described with respect to FIG. 7, is used to support the machine tool assemblies 140 in their operative position in vertically overlying relationship in columns and in horizontally spaced relationship in rows. The surfaces 130,132 are spaced to match the spacing of the end supports 142, 148 which bear thereagainst with the machine tool assemblies 140 in the operative position within the compartments 124.

Figure 13:
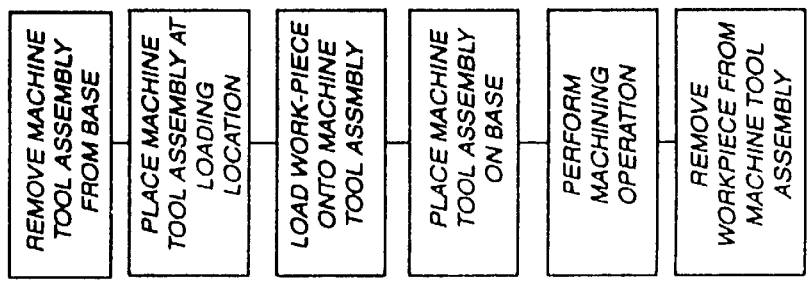
FIG. 13 is a flow diagram showing steps that can be used to perform a machining operation according to the present invention and using one of the inventive bases in FIGS. 5–12.

Referring to FIGS. 10 and 13, one exemplary method of using the invention to perform a machining operation will be described. The machine tool assemblies 140 may initially be in the operative position shown in FIG. 10 or in a storage position. A lift, which may be a crane 216, or the like, removes the machine tool assemblies 140, one by one, from the compartments 124 and delivers the same to a first workpiece loading location 218. At the loading location, workpieces can be placed into an operative position to thereby prepare the machine tool assemblies for the performance of a machining operation. Once the machine tool assembly 140 is prepared to machine the workpiece thereon, the machine tool assembly 140 with the loaded workpiece can be lifted by the crane 216 and placed in one of the compartments 124, whereupon a machining operation is performed. The machined workpiece can then be removed by either removing the machine tool assembly 140 from its compartment and thereafter removing the workpiece, or by removing the workpiece from the machine tool assembly 140 with the machine tool assembly 140 in the compartment 124.

With this arrangement, efficient vertical space utilization is possible. Multiple machining operations can be performed in a coordinated fashion and simultaneously for efficient machining.

DESCRIPTION OF THE PREFERRED EMBODIMENTS

Another aspect of the invention is the provision of a transfer assembly which allows controlled delivery of elongate workpieces from a supply thereof selectively to different machining units, as on the machining tool assemblies 140, for performance of desired processing operations thereon. One form of transfer assembly, according to the present invention, is shown at 300 in FIGS. 14–17 in association with machine tool assemblies 140 mounted on a frame 200, and in turn upon a secondary base 198 of the type shown in FIG. 12 and described in detail above. It should be understood that the transfer assembly 300 does not depend either upon the nature of the machining units that are part of the machine tool assemblies 140 or the precise stacking arrangement. The embodiment in FIGS. 14–17 is but exemplary of one particular environment for the inventive transfer assembly.

The transfer assembly 300 consists of at least one, and in this case six, supply units 302, 304, 306, 308, 310, 312, each having a similar construction and designed to hold a plurality of elongate workpieces 314. Exemplary supply unit 308 has an inclined feeding surface 316 defined cooperatively by spaced, elongate beams 318, 320. The elongate workpieces 314 are guided by the feeding surface 316 under the force of gravity into an accumulated state, one against the other. The most downstream workpiece 314 assumes a pickup position.

Workpieces of different diameter, length, and composition can be mixed on the various supply units 302, 304, 306, 308, 310, 312. The transfer assembly 300 is constructed so that the workpieces on each supply unit 302, 304, 306, 308, 310, 312 can be picked up, one by one, and selectively delivered to any of six different locations, corresponding to an operating position on a machining unit on each machine tool assembly 140.

The transfer assembly 300 consists of a shuttle assembly 324 which is guided in vertical movement by a guide assembly 326, in this case consisting of spaced, vertical columns 328, 330 with vertically extending slots 332, 334 to accommodate rails 336, 338. The rails 336, 338 are guided vertically within the slots 332, 334 to allow the shuttle assembly 324 to be placed in three different workpiece pickup positions and three different workpiece delivery positions, as hereinafter described. More particularly, the shuttle assembly 324 consists of a main frame 340 which is fixed to the rails 336, 338. The main frame 340 and rails 336, 338 thus move together as a unit guidingly in a vertical direction.

The main frame 340 supports a repositionable workpiece holder 342. The workpiece holder 342 defines a cradle with a generally U-shaped, upwardly opening surface 344 with a base surface portion 346 defining a receptacle and spaced leg portions 348,350 projecting from the base surface portion 346. The workpiece holder 342 has spaced ears 352, 354 depending from the surface 344 and connected to the main frame 340 by pins 356, 358 for pivoting movement about a horizontally extending axis 360.

Figure 15:
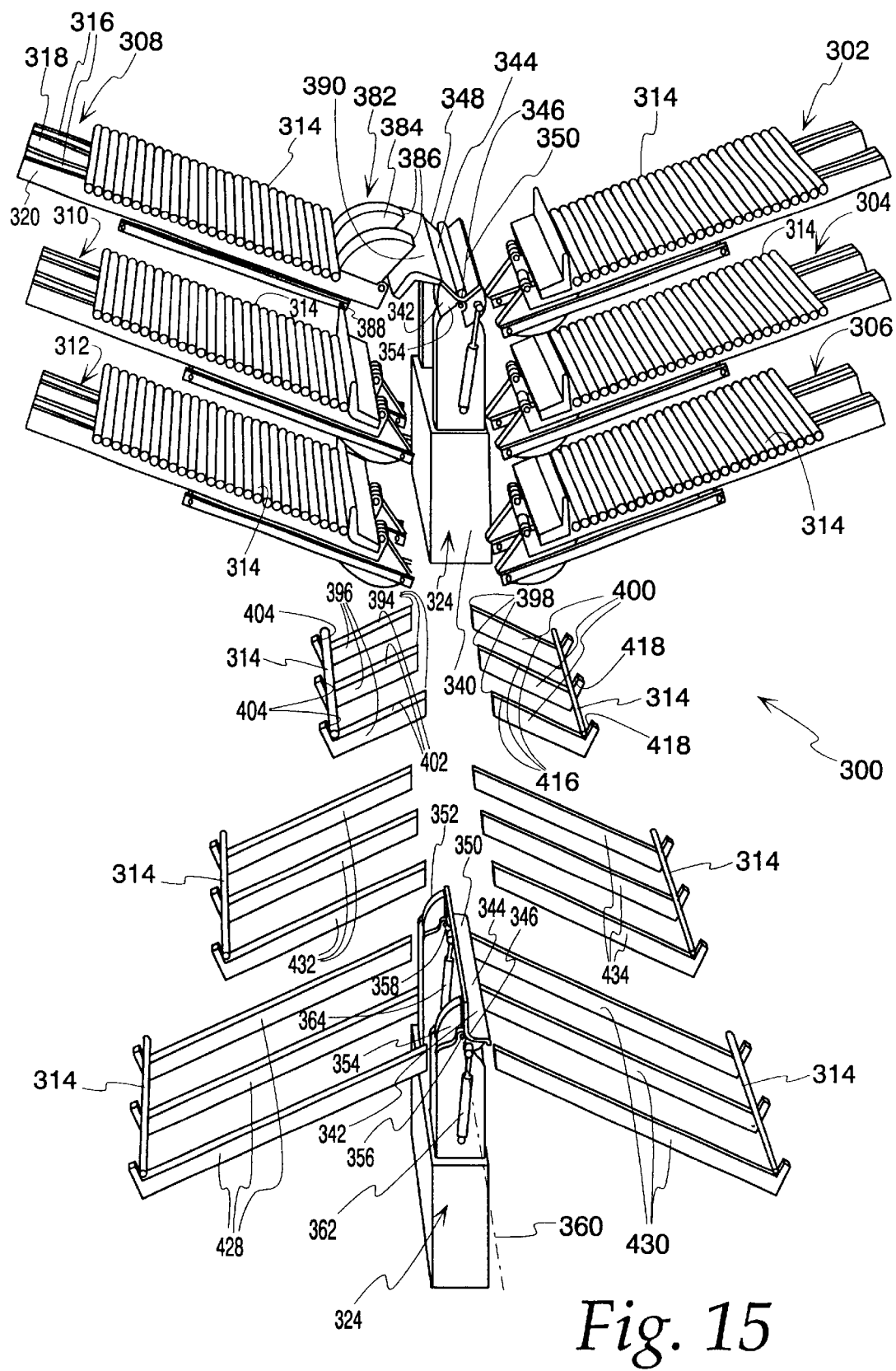
FIG. 15 is an exploded, top, end, and side perspective view of the transfer assembly in FIG. 14.
Figure 16:
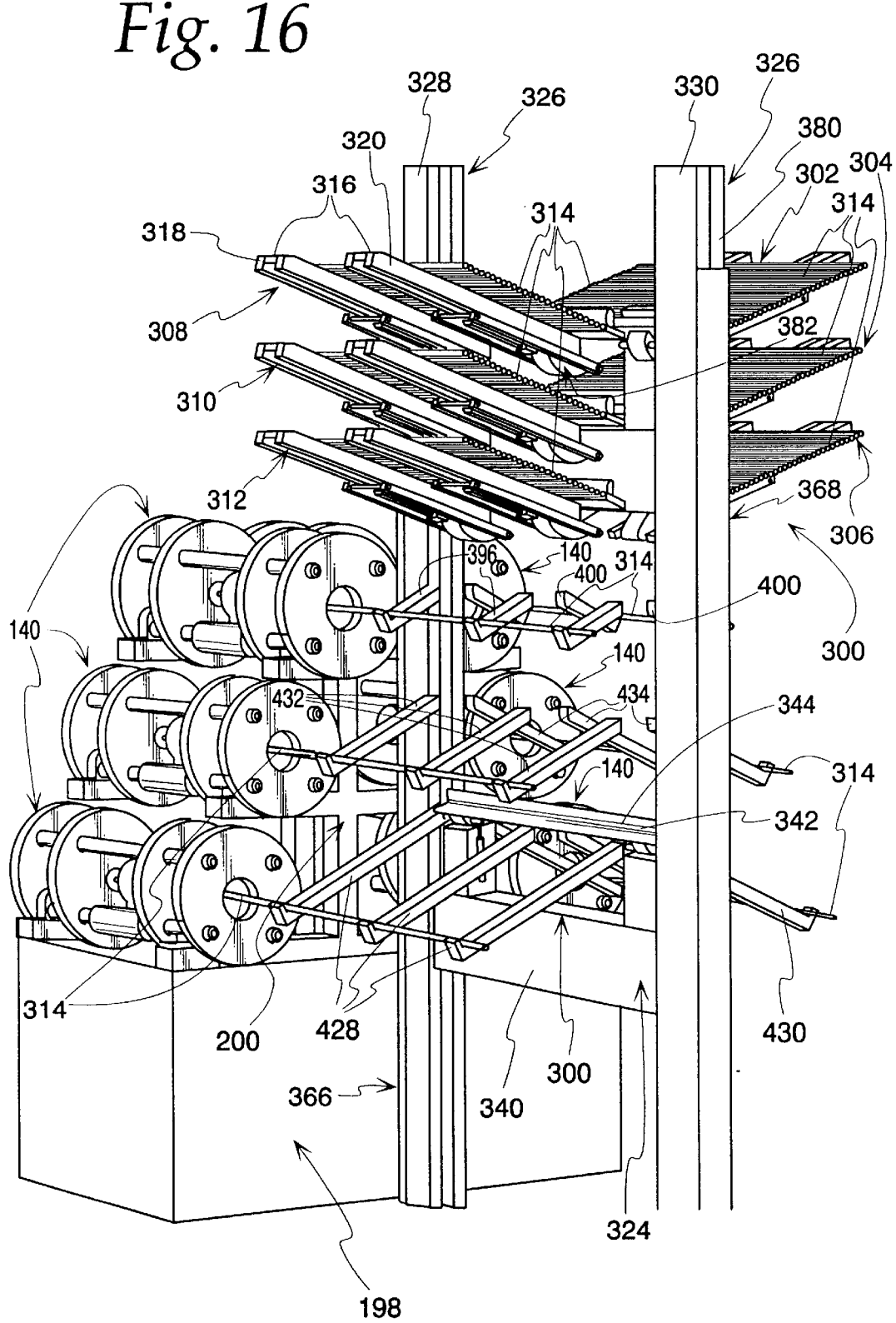
FIG. 16 is a side, end, and bottom perspective view of the processing system of FIG. 14.

Actuator cylinders 362, 364 are connected between the main frame 340 and workpiece holder 342. Operation of the cylinders 362, 364, to vary the effective length thereof, causes pivoting of the workpiece holder 342 about the axis 360 between a first transfer position, as shown at the bottom of FIG. 15, and a second transfer position, as shown in FIG. 16. The workpiece holder 342 is in a conveying/holding position between the first and second transfer positions. A workpiece 314 resides within the upwardly opening receptacle defined by the base surface portion 346 with the workpiece holder 342 in the conveying/holding position.

The vertical position of the shuttle assembly 324 is controlled by extensible cylinders 366, 368, associated one each with the columns 328, 330. The rail 336 has a stub projection 370 which is attached to the free end 372 of the cylinder 366. A similar stub projection 374 on the rail 338 is connected to the end 376 of the rail 338. The cylinders 366, 368 have repositionable rods 378, 380, respectively. With the cylinder ends remote from the ends 372, 376 fixed relative to the beams 328, 330, retraction of the rods 378, 380 causes a corresponding downward movement of the rails 336, 338 and main frame 340 attached thereto. Extension of the rods 378, 380 produces the opposite result.

Figure 14:
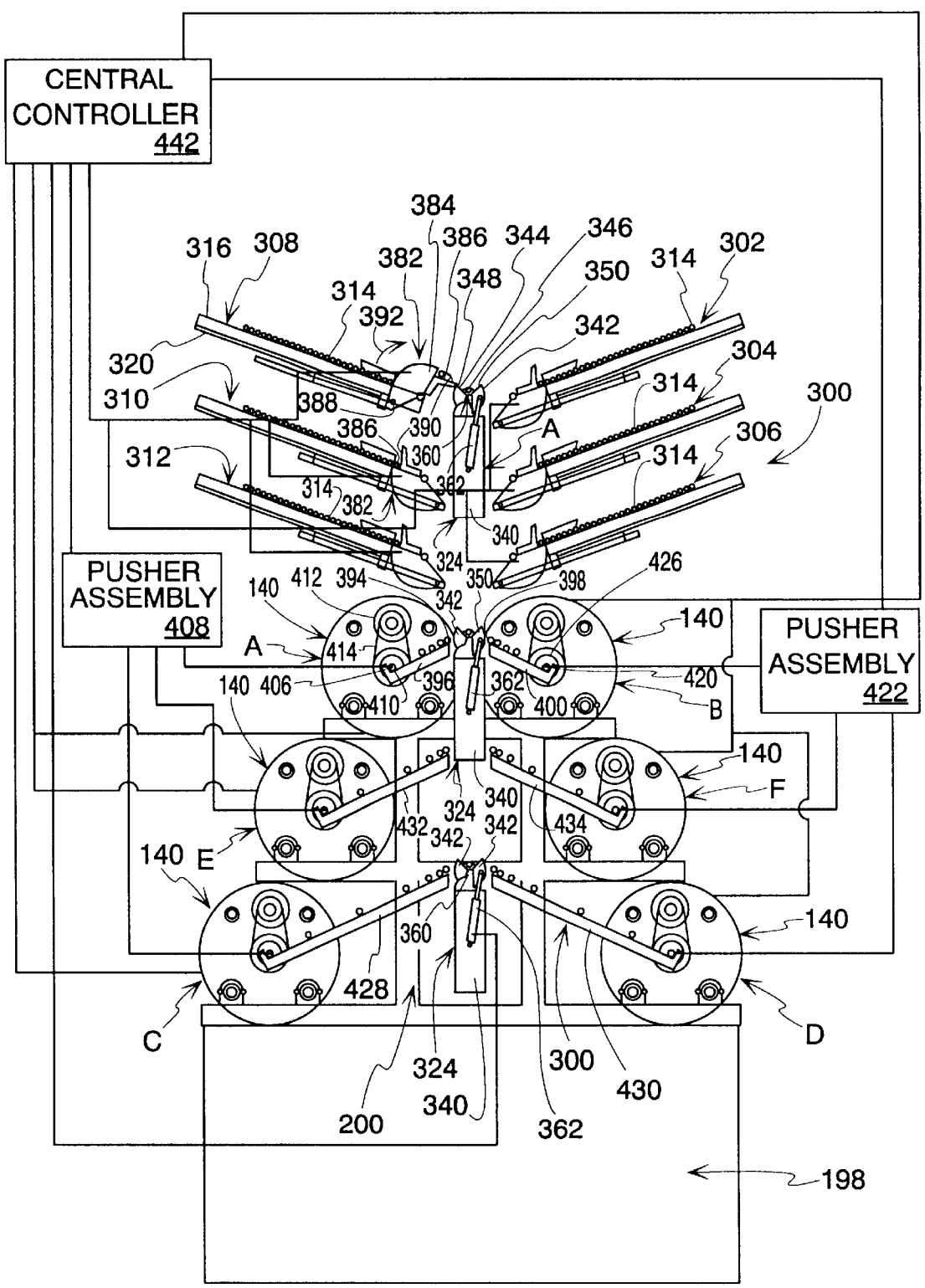
FIG. 14 is an end elevation view of a system for processing elongate workpieces according to the invention and including a transfer assembly for delivering elongate workpieces in a supply unit to individual machining units shown stacked on a representative base of the type shown in FIG. 12.

Extension of the cylinder rods 378, 380 places the shuttle assembly 324 in a first pickup position as shown at "A" in FIG. 14. In this position, workpieces can be transferred from either of the supply units 302, 308 into the receptacle at the base surface portion 346. The shuttle assembly 324 can be controllably repositioned by operating the cylinders 362, 364 to place the shuttle assembly 324 into second and third different pickup positions. In the second pickup position, the shuttle assembly 324 is situated relative to the supply units 304, 310 in the same manner as it is shown situated relative to the supply units 302, 308 in FIG. 14. In the third pickup position, the shuttle assembly 324 is situated relative to the supply units 306, 312 in the same manner as is situated relative to the supply units 302, 308 in FIG. 14.

With the shuttle assembly 324 in the first pickup position, shown in FIG. 14, workpieces 314 can be delivered thereto from either supply unit 302, 308 in a similar fashion. This process will be described for transfer of workpieces 314 from a stored position on representative supply unit 308. To effect this transfer, a loading unit 382 is utilized. The loading unit consists of a body 384 defining pickup shoulders 386 which are pivotable about the axis of a pin 388 between a pickup position, as shown for the corresponding loading unit 382 on the supply unit 310, therebelow, and a release position, shown for the loading unit 382 on the supply unit 308 in FIG. 14. In the pickup position, the shoulder 386 resides beneath the most downstream workpiece 314 at a pickup location. The workpiece at the pickup location is blocked from further downward shifting by a pickup shoulder 390.

The loading unit 382 is pivoted in the direction of the arrow 392, thereby causing movement of the elongate workpiece from the pickup location toward the workpiece holder 342. As the pickup shoulder 386 approaches the release position, the pickup shoulder 390 is in a declined orientation so that the workpiece 314 held by the workpiece holder 342 moves under its own weight guidingly down the surface of the pickup shoulder 390 to the receptacle 346 on the workpiece holder 342 to the conveying/holding position.

By then retracting the rods 378, 380, the shuttle assembly 324 can be moved downwardly to any of three delivery/release positions. Two such positions are shown in FIG. 14, with the third residing between the first two. With the shuttle assembly 324 in the topmost delivery/release position shown in FIG. 14, the work piece 314 carried by the workpiece holder 342 resides above the upper edges 394 of three guide beams 396 associated with the machine tool assembly 140 identified at "A" and corresponding upper edges 398 associated with three guide beams 400 associated with the machine tool assembly identified at "B". The guide beams 396 have guide surfaces 402 along which workpieces are guided downwardly under gravitational force to against stop shoulders 404 angularly disposed to the guide surfaces 402. With a workpiece 314 nested at the juncture of the guide surfaces 402 and stop shoulders 404, the central axis of the workpiece is coincident with a central operating axis 406 for the machine tool 140 at "A". A pusher assembly 408 is operable to advance the operative workpiece 314 along the axis 406 to a first location wherein it can be grasped by a spindle on the machining unit 140 at "A" that is driven in rotation by a motor 412 through a power transmission belt 414.

Figure 17:
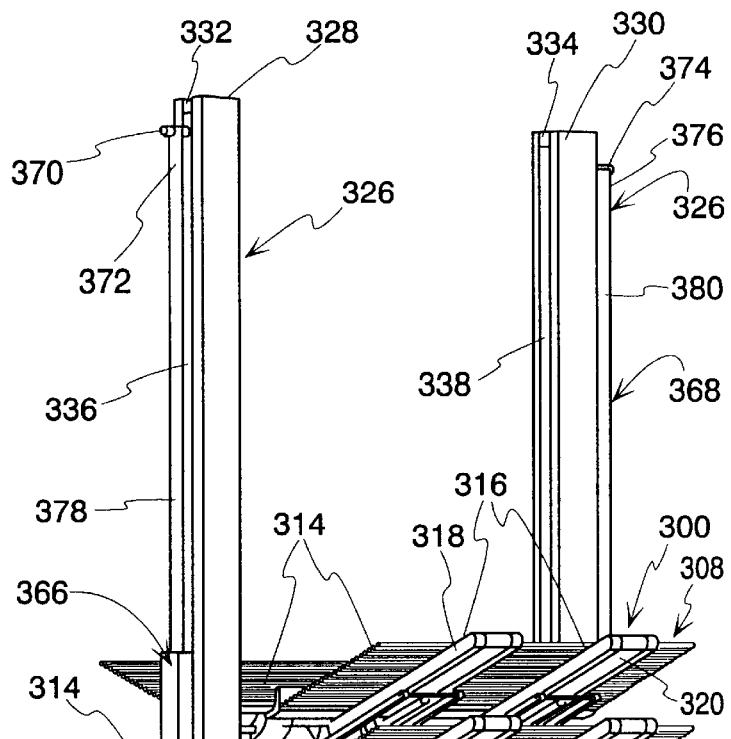
FIG. 17 is a bottom perspective view of the processing system taken from the opposite end and same side as in FIG. 16.
Figure 17:
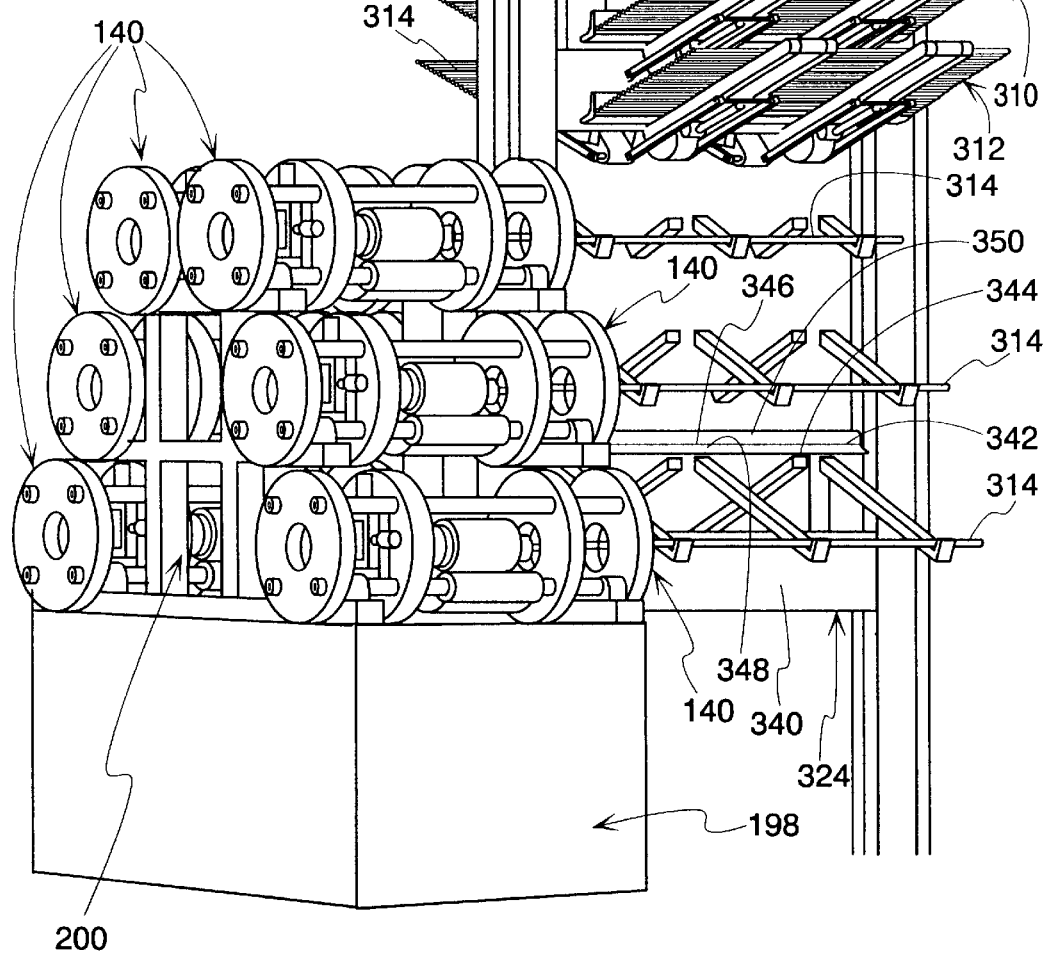

With the shuttle assembly 324 in the top delivery/release position of FIG. 14, and the workpiece holder in the conveying/holding position, operation of the cylinders 362, 364 pivots the workpiece holder 342 to the second transfer position of FIG. 17, whereupon the surface of the leg portion 348 declines to guide the workpiece 314 in the conveying/holding position downwardly to the guide surfaces 402.

Opposite pivoting of the workpiece holder 342 to the first transfer position is carried out to cause the workpiece 314 in the conveying/holding position to be directed by the surface of the leg portion 350 to, and guidingly down, guide surfaces 416 on the guide beams 400 to against stop shoulders 418 corresponding to the stop shoulders 404. The workpiece 314 nested at the juncture of the guide surfaces 416 and stop shoulders 418 has its central axis coincident with the central operating axis 420 of the machining unit on the machine tool assembly 140 at "B" in FIG. 14. A pusher assembly 422 operates like the pusher assembly 408 to advance the operative workpiece 314 into a location wherein it is operatively held by a spindle 426 on the machining unit 140 at "B".

The shuttle assembly 324 is movable by operation of the cylinders 366, 368 to be placed selectively in the second and third delivery/release positions. The by third delivery/release position for the shuttle assembly 324 is as shown in FIG. 14. In that position, the workpiece holder 342 cooperates with guide beams 428, 430 to selectively deliver workpieces to an operative location with machining units at "C" and "D", respectively, in FIG. 14. With the shuttle assembly 324 approximately midway between the first and second delivery/release positions in FIG. 14, the workpiece holder 342 cooperates with guide beams 432, 434 to controllably direct workpieces 314 to an operative location with respect to the machine tool assemblies 140 at "E" and "F" in FIG. 14.

Figure 18:
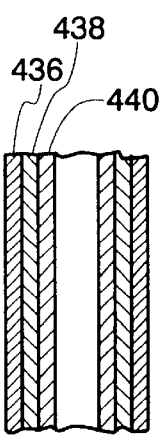
FIG. 18 is an enlarged, fragmentary, cross-sectional view of telescoping cylindrical elements used to selectively vertically reposition a workpiece shuttle assembly on the processing system in FIGS. 14–17.

In order to reduce the overall height of the transfer assembly 300, the cylinders 366, 368 can be made with a telescoping construction, as shown in FIG. 18, including multiple telescoping parts 436, 438, 440.

The entire processing system, as described above, can be automatically programmed and operated through a central controller 442. The central controller 442 can be programmed to coordinate operation of the six loading units 382, the actuating cylinders 362, 364, the pusher assemblies 408, 422, and the six machine tool assemblies 140 to selectively and serially deliver work pieces 314 for coordinated processing by the six machining units on the machine tool assemblies 140.

The invention contemplates many variations from the basic structure described above. Some representative variations contemplated will be described below.

Figures 19, 20, 21:
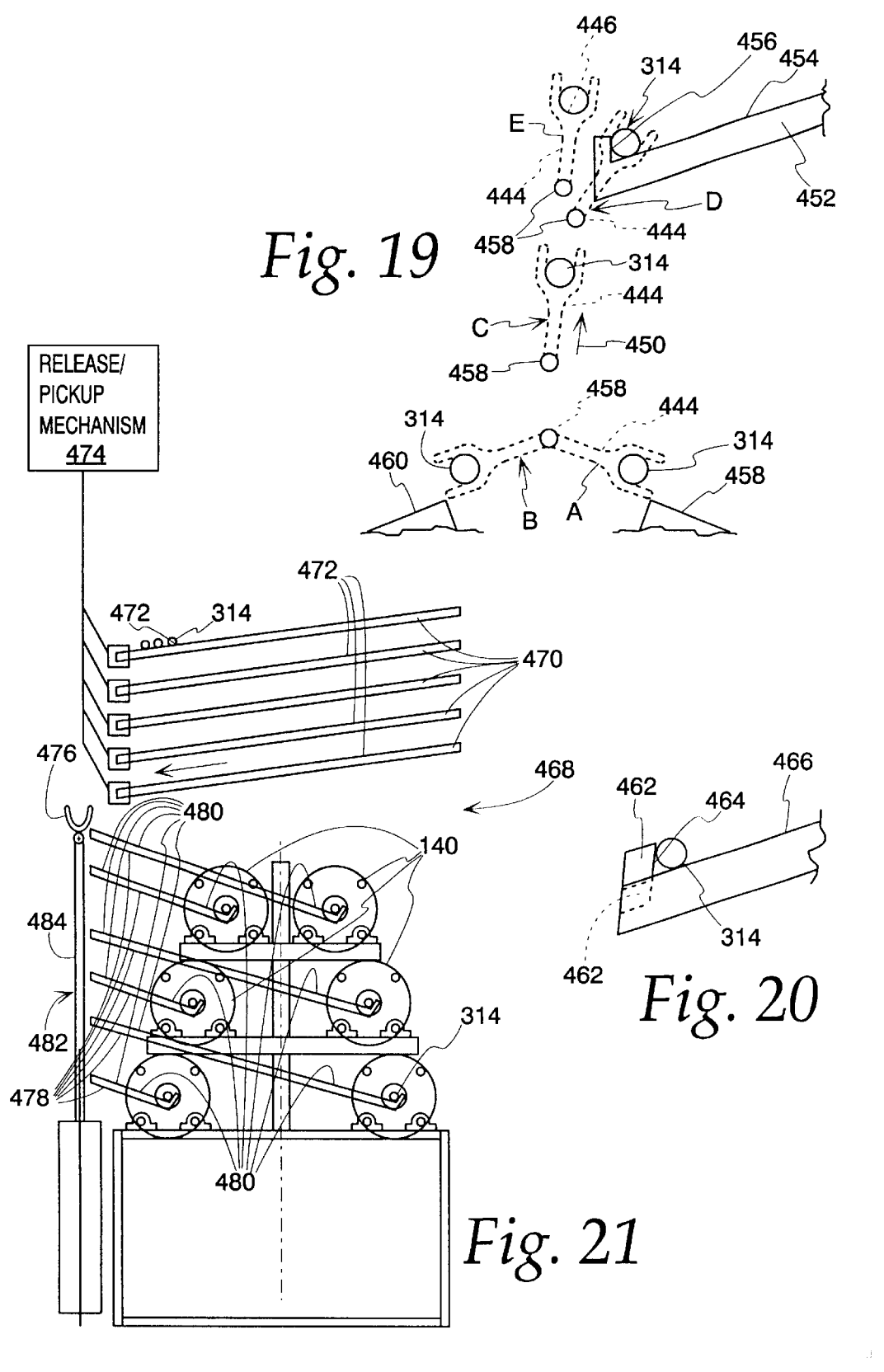

In FIG. 19, a modified form of workpiece holder is shown at 444 having a generally "Y"-shaped construction. The workpiece holder 444 has a receptacle 446 for a workpiece 314. The workpiece holder 444 is pivotable about a pin 458 between first and second transfer positions "A", "B", corresponding to the transfer positions for the previously described workpiece holder 342. Between the transfer positions, the workpiece holder 444 assumes an upright conveying/holding position as shown at "C". The workpiece holder 444 is also pivotable about the pin 458 from the conveying/holding position to a pickup position "D".

With this arrangement, the workpiece holder 444 can be advanced upwardly in the direction of the arrow 450 from the "C" position and pivoted to the "D" position to advance between the beams 452 (one shown). The beams 452 have inclined feeding surfaces 454 which guide the workpieces 314 into an accumulated position against a pickup shoulder 456. Continued upward movement of the workpiece holder 444 causes the most downstream workpiece 314 to be advanced into the receptacle 446 and causes the workpiece holder 444 to advance the workpiece 314 that is picked up upwardly past the pickup shoulder 456. The workpiece holder 444 can then be pivoted to the "E" position and advanced downwardly to thereafter be moved into either of the laterally spaced transfer positions to deliver the carried workpiece 314 to guide surfaces 458, 460 through which the workpieces 314 are directed to spaced machine tool assemblies 140. The arrangement in FIG. 18 obviates the need to use an independent loading unit as previously described.

In a further modification, shown in FIG. 20, a retractable gate element 462 can be used to define a pickup shoulder 464 at the base of a feeding surface 466. By controllably retracting the gate element 462 to the dotted line position, the most downstream workpiece 314 can be released from a stored position for advancement toward a machining unit through any structure as described either above or below.

In FIG. 21, another modified form of transfer assembly is shown at 468. The transfer assembly 468 has a supply unit with a series of vertically spaced beams 470 with inclined feeding surfaces 472. Through an appropriate release/pickup mechanism 474, the workpieces 314 can be delivered one-by-one to a workpiece holder 476 that is capable of vertically repositioning to selectively align at the top of beams 478. The beams 478 have guide surfaces 480 onto which the workpiece holder 476 deposits a workpiece 314 for guided movement to the machine tool assemblies 140. The workpiece holder 476 is mounted to a cylinder 482. By reason of extending and retracting a rod 484 on the cylinder, vertical repositioning of the workpiece holder 476 is effected. The workpiece holder 476 can release the carried workpiece 314 at the desired guide surface 480 through any appropriate mechanism, such as those described above, below, or otherwise known to those skilled in the art. With the transfer assembly 468, delivery of workpieces 314 to all six of the machine tool assemblies 140 can be effected from one side thereof.

Figure 22:
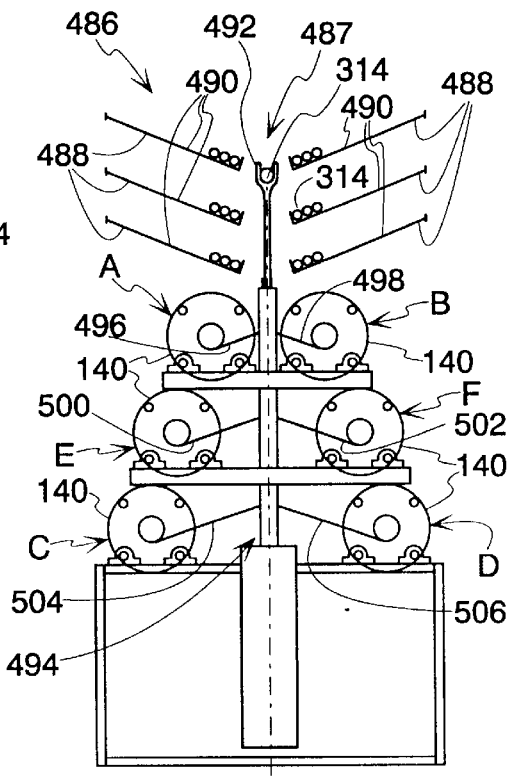
FIG. 22 is a view as in FIG. 21 of a still further modified form of transfer assembly, according to the present invention.

A further variation of the transfer assembly, according to the present invention, is shown at 486 in FIG. 22. The transfer assembly 486 consists of a supply unit at 487 having guide beams 488 with feeding surfaces 490 that converge toward a workpiece holder 492. The workpiece holder 492 is carried on a cylinder 494. By operating the cylinder 494, the workpiece holder 492 can be selectively placed in any of the three pickup positions to receive a workpiece 314 from any one of the feeding surfaces 490 on the supply unit 487. Workpiece transfer from the supply unit 487 to the workpiece holder 492 in a conveying/holding position can be accomplished by any means heretofore described, described hereinbelow, or otherwise known to those skilled in the art.

With the workpiece 314 in the conveying/holding position, a telescoping rod 494 on the cylinder 494 can be controllably extended and retracted to align the workpiece holder 492 at any of three different delivery/release positions at any of the three rows of machine tool assemblies 140, i.e. A,B; E,F; C,D. At the uppermost delivery/release position, the workpiece holder 492 resides between guide beams 496, 498, which incline toward the central operating axis for the machine tool assemblies at "A" and "B", respectively. By selectively repositioning the workpiece holder 492, through pivoting or otherwise, to either of first and second transfer positions corresponding to those previously described, the workpiece 314 in the conveying/holding position can be transferred to the guide beams 496, 498 for delivery as into coaxial relationship with the central operating axis for the machine tool assemblies at "A", "B". Like beams 500, 502 are associated with the machine tool assemblies "E", "F", with guide beams 504, 506 similarly associated with the machine tool assemblies "C", "D".

Figure 23:
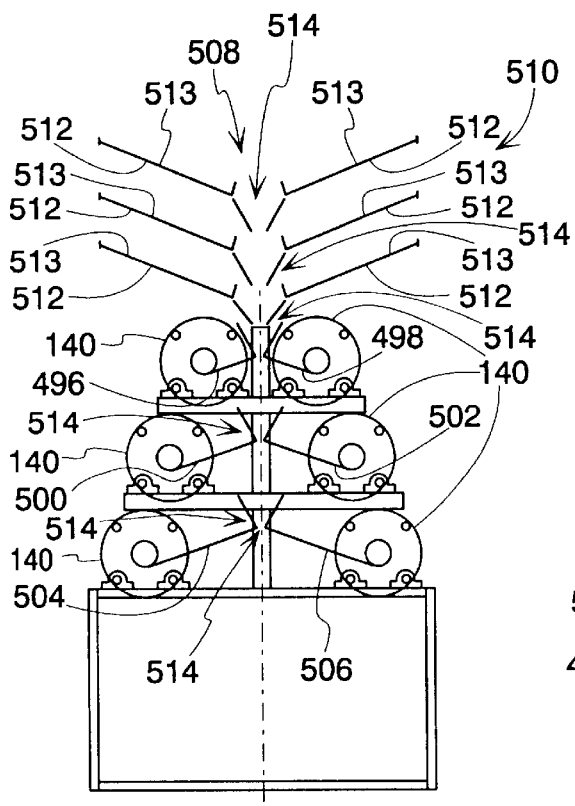
FIG. 23 is a view as in FIGS. 21 and 22 of a still further modified form of transfer assembly, according to the present invention.
Figure 24:
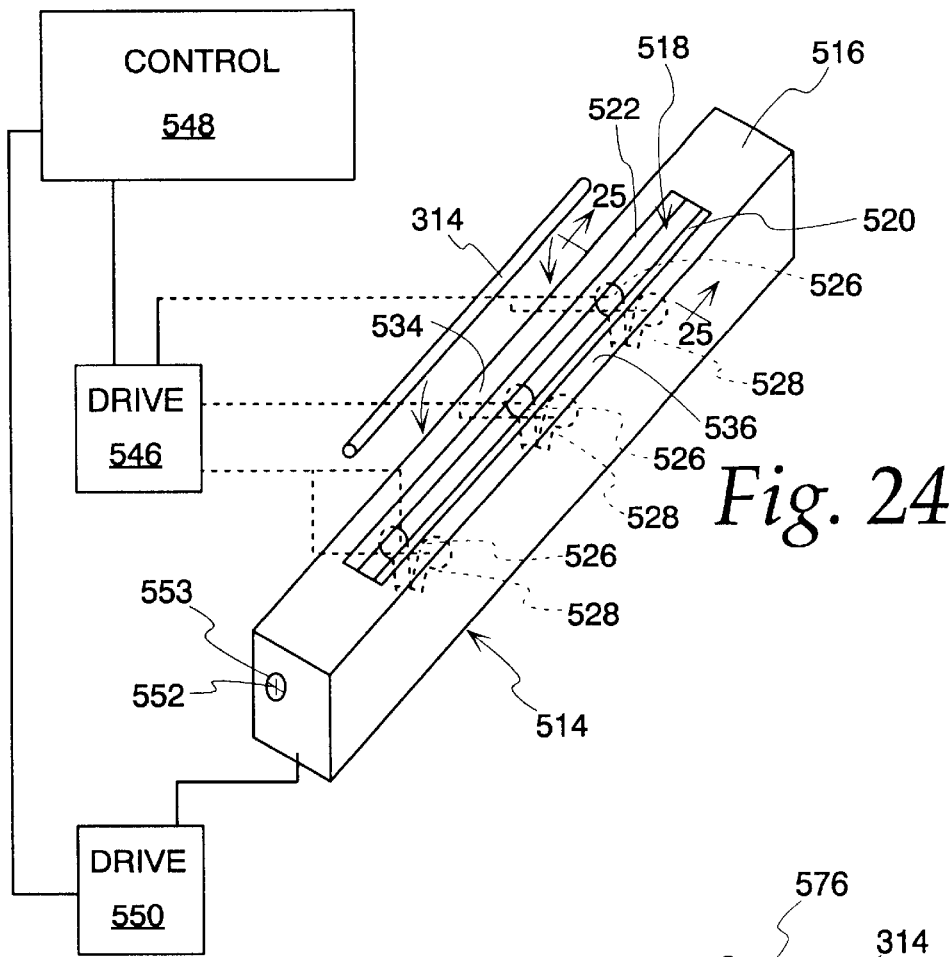
FIG. 24 is an enlarged, perspective view of a workpiece holder for selectively holding, releasing, and redirecting workpieces on the system in FIG. 23.
Figure 25:
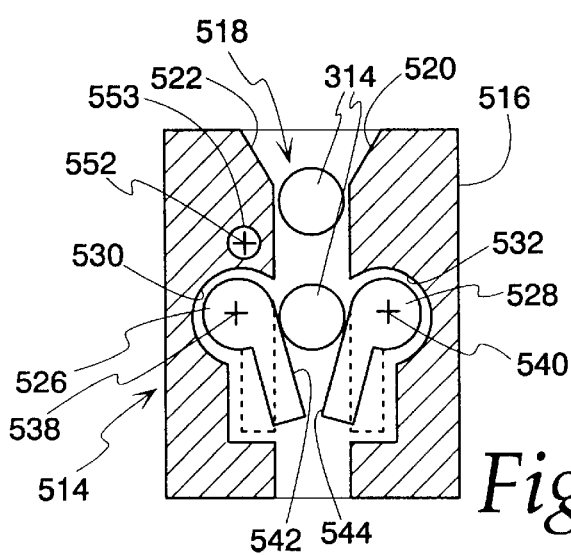
FIG. 25 is a cross-sectional view of the workpiece holder taken along line 25—25 of FIG. 24.

In FIGS. 23–25, a further modified form of transfer assembly, according to the present invention, is shown at 508. The transfer assembly 508 consists of a supply unit 510 with guide beams 512 having converging feeding surfaces 513 as on the supply unit 487 in FIG. 21. The transfer assembly 508 utilizes the same arrangement of guide beams 496, 498, 500, 502, 504, 506 associated with the machine tool assemblies 140, as in FIG. 22.

Instead of a single workpiece holder, such as the workpiece holder 492, the intransfer assembly 508 utilizes multiple workpiece holders 514. Each workpiece holder consists of a frame 516 with a pass through opening 518 for a workpiece 314. The entry to the opening 518 has converging surfaces 520, 522 which guide a downwardly moving workpiece 314 into the through opening 518.

The workpiece holder 514 has a plurality, and in this case three, pairs of cooperating holding elements 526, 528. The holding elements 526, 528 are mounted in cutouts 530, 532 within spaced walls 534, 536 bounding the through opening 518. Each of the holding elements 526, 528 has a generally L-shaped construction. The holding elements 526, 528 are pivotable about parallel axes 538, 540 between the solid line position, representing a holding state for the workpiece holder 514, and a dotted line position, representing a release state for the workpiece holder 514. In the holding state, the holding elements 526, 528 are situated so that the edges 542, 544 thereon extend into the opening 518 so as effectively reduce the dimension of the opening 518 so that the passage of a workpiece 314 therethrough is prevented. In effect, the workpiece 314 becomes releasably clamped between the holding elements 526, 528. With the workpiece holder 514 in the release state, the holding elements 526, 528 are in the dotted line position and a workpiece 314 is allowed to pass unobstructedly through the opening 518.

An appropriate drive 546 is operable through a control 548 to change the state of the workpiece holder 514 between the holding and release states. A separate drive 550 is operable to rotate the entire workpiece holder 514 around an eccentric pivot axis 552 defined by a mounting pin 553.

In operation, workpieces 314 are selectively released from the supply unit 510 into the immediately adjacent workpiece holder 514. Through the control 548, the states of the holding elements 526, 528 in the vertically arranged group of workpiece holders 514 are coordinated so that a workpiece 314 is held and released to ultimately be held in the transfer position between one of the guide beams 496, 498, 500, 502, 504, 506 adjacent to the machining unit at which the workpiece is to be delivered. At the point of delivery, the receiving workpiece holder is in the holding state. By then pivoting the workpiece holder 514 about the axis 552, the through opening 518 can be oriented so that a workpiece in the conveying/holding position is released to allow the held workpiece 314 to move guidingly under its own weight onto the appropriate guide beam 496, 498, 500, 502, 504, 506 and thereagainst to the selected machining unit A, B, C, D, E, F.

As just one example, a workpiece 314 from the uppermost guide beam 512 can be transferred to the workpiece holder 514 in a receiving position thereadjacent. The receiving workpiece holder 514 can either be in the holding state or in the release state. Eventually, the workpiece holder 514 must be placed in the release state to allow the workpiece 314 to travel through the two underlying workpiece holders 514 to the workpiece holder 514 at the location where it can be transferred, by pivoting of the workpiece holder 514, to the desired machining unit 140.

Figure 26:
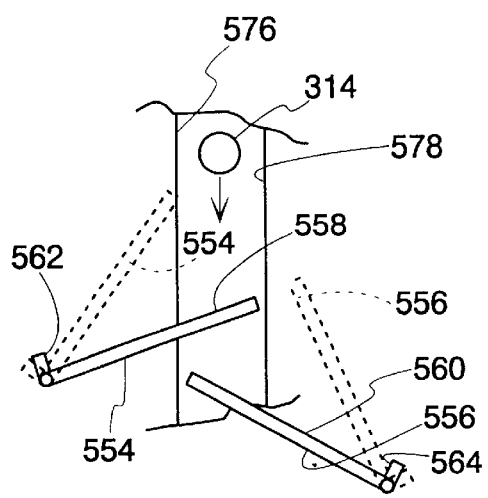
FIG. 26 is a fragmentary, end elevation view of modified form of transfer assembly, according to the present invention, and including pivotable beams which are selectively moved between operative and bypass positions to intercept downwardly moving workpieces for direction thereof to machining units.

In FIG. 26, a modified form of transfer assembly, according to the present invention, is shown. In this embodiment, guide beams 554, 556, corresponding to the guide beams 496, 498, 500, 502, 504, 506, are pivotably mounted between solid line operative positions and phantom line by-pass positions. In the operative position, guide surfaces 558, 560 are situated to intercept a downwardly moving workpiece 314. In the bypass position, the guide surfaces 558, 560 are moved out of the path of the downwardly moving workpieces 314. If the guide beam 554 is placed in the by-pass position, the workpiece 314 will be picked-up by the guide surface 560 of the beam 556 with the beam 556 in the operative position. Similarly, if the guide beam 554 is in the operative position, the workpiece 314 will be intercepted by the guide surface 558. The guide beams 554, 556 have stop shoulders 562, 564, respectively, to which downwardly moving workpieces 314 on guide surfaces 558, 560 abut.

Figure 27:
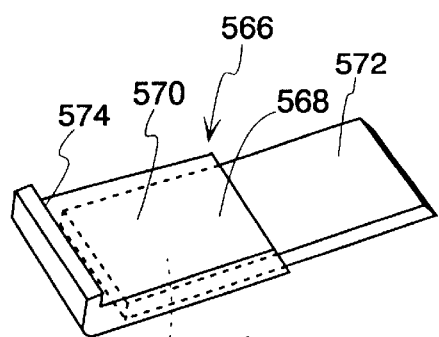
FIG. 27 is a perspective view of a modified form of guide beam that can be reconfigured between operative and bypass positions to selectively intercept or allow passage of downwardly moving workpieces.

As an alternative to pivotably repositioning the entire guide beam 554, 556 between operative and by-pass positions, each guide beam can be reconfigurable such as the guide beam 566 in FIG. 27. The guide beam 566 has an upper guide surface 568 defined by telescoping parts 570, 572. A stop shoulder 574 intercepts downwardly moving workpieces along the guide surface 568. The guide beam 566 is shown in the operative position in solid lines. With the part 572 retracted to the dotted line position, the guide beam 566 is placed in the bypass position. That is, its effective length is such that it does not reside in the path of a downwardly moving workpiece 314 as to cause diversion thereof to a machining tool on a machine tool assembly 140.

In the embodiment shown in FIGS. 26 and 27, to control workpiece movement, it may be desirable to provide guide walls 576, 578, which confine horizontal shifting of downwardly moving workpieces 314. It is possible with these embodiments to use any type of supply unit and any appropriate structure for releasing the individual workpieces from the supply unit.

Figure 28:
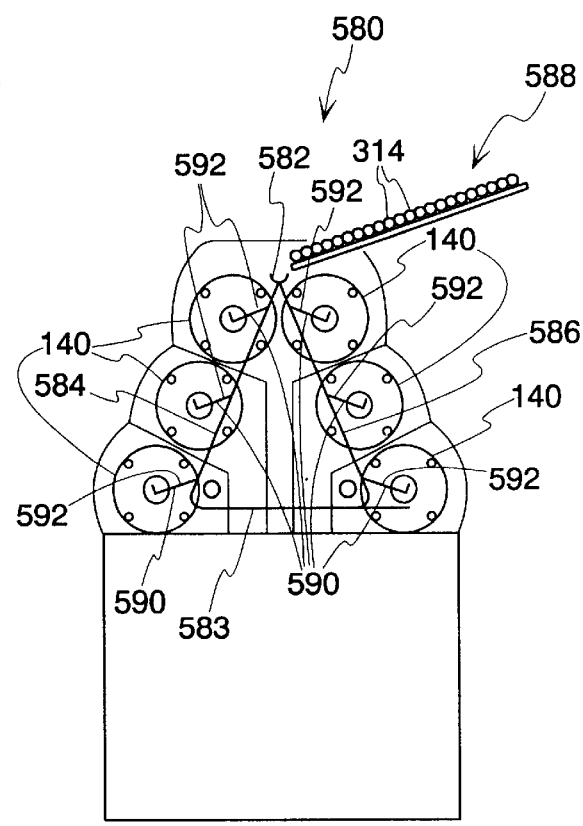
FIG. 28 is a view as in FIGS. 21–23 of a still further modified form of transfer assembly, according to the present invention.

A variation of this system is shown in FIG. 28 wherein a transfer assembly 580 is shown consisting of a workpiece holder 582 which is guidable, as by an endless member 583 trained in a predetermined path, selectively from an apex position, as shown in FIG. 28, along the vertically extending legs 584, 586 of an inverted V-shaped path. Once the workpiece 314 is transferred from a supply unit 588 to the workpiece holder 582, the workpiece holder 582 can be selectively moved along either of the legs 584, 586 to a desired delivery position adjacent to one of the machining units on a machine tool assembly 140 to which a transfer is to be made. Each machine tool assembly 140 has an associated guide beam 590 with an inclined guide surface 592 to accept a workpiece 314 from the workpiece holder 582 and guide the same into the desired operative relationship with a machining unit.

As an alternative, the guide beams 590 could be reconfigurable between operative and bypass positions. The workpiece holder 582 could, from the apex position shown, deliver a workpiece down either leg 584, 586, to be picked up by the first operatively positioned guide beam 590.

Figure 29:
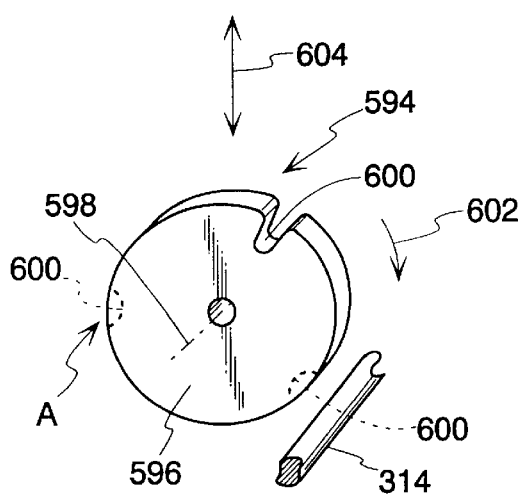
FIG. 29 is a perspective view of an alternative form of loading unit for picking up and strategically releasing workpieces for delivery to machining units.

Another variation to the basic transfer assembly is shown in FIG. 29. A loading unit is shown at 594 and consists of a disc-shaped element 596 which is pivotable about an axis 598 between a pickup position, shown in solid lines, and a release position. In the pickup position, a notch 600 is positioned to engage a workpiece 314 at a pickup location on a supply unit. Once this occurs, the element 596 can be pivoted about the axis 598 in the direction of the arrow 602 until the notch 600 assumes the dotted line position, whereupon the workpiece 314 releases under the force of gravity. The disc-shaped element 596 is rotated oppositely to the direction of the arrow 602 so that the workpiece 314 can be released therefrom at the position "A" shown in FIG. 29.

The disc-shaped element 596 can be moved vertically, in the direction of the double-headed arrow 604, to align with different beams to feed the workpieces from a supply to different vertical heights. The same arrangement can be used to pick up workpieces 314 from either horizontal side of the axis 598.

Figure 30:
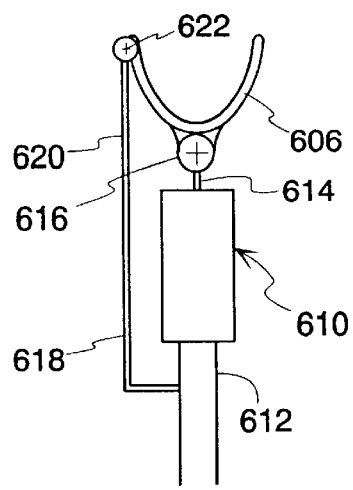
FIG. 30 is a fragmentary, elevation view of a mechanism for selectively tipping a cradle on a workpiece holder, according to the present invention, to selectively deliver workpieces to machining units on different sides of the cradle.
Figure 31:
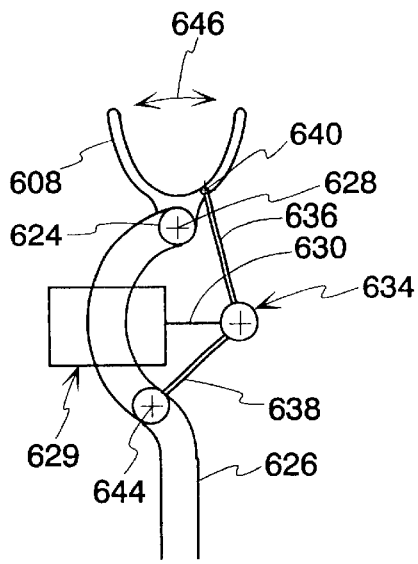
FIG. 31 is a view as in FIG. 30 of a modified form of a system for tipping a cradle.

In FIGS. 30 and 31, different mechanisms are shown for repositioning a cradle 606,608 for a workpiece on a workpiece holder. In FIG. 30, a cylinder 610 is mounted on a vertically extending support 612. The cylinder 610 has a rod 614 with an end 616 pivotably connected to the cradle 606. An L-shaped arm 618 extends from the support 612. The arm end 620 remote from the support 612 is pivotably connected to the cradle 606. By selectively extending and retracting the rod 614, the cradle can be pivoted about an axis 622 to tip a workpiece in a conveying/holding position therein to one side or the other.

In FIG. 31, the cradle 608 is pivotably connected adjacent to the free end 624 of a support 626. Through this pivot connection, the cradle 608 is pivotable about an axis 628. An operating cylinder 629 has a repositionable rod 630 which is pivotably connected at a joint 634 at which link elements 636, 638 are pivotably connected. The end of the link 636 remote from the joint 634 is connected to the cradle 608 for relative pivoting movement about an axis 640, which is substantially parallel to the axis 628. The end of the link element 638 remote from the joint 634 is connected to the support 626 for pivoting movement about an axis 644.

Extension and retraction of the rod 630 effects a reconfiguration of the linkage made up of the elements 636, 638 to selectively tip the cradle 608 in opposite directions, as indicated by the double-headed arrow 646. To accommodate the linkage, the support 626 is made U-shaped in the region at which the cylinder 629 is mounted. This potentially compacts the horizontal space requirements for operation of the cylinder 629 and linkage made up of the link elements 636, 638.

It should be understood that while several variations of transfer assemblies according to the present invention have been shown, many of these variations have been intended only to be illustrative. The mechanisms shown in U.S. Pat. No. 5,911,803, as well as those known to persons skilled in the art, could be utilized to make other modifications to the various structures shown.

The foregoing disclosure of specific embodiments is intended to be illustrative of the broad concepts comprehended by the invention.

What is claimed is:

1. A system for processing elongate workpieces, said system comprising:
   a first machining unit for performing a first processing operation on an elongate workpiece that is situated at a first location;
   a second machining unit for performing a second processing operation on an elongate workpiece that is situated at a second location that is vertically spaced from the first location;
   a first supply unit on which a plurality of elongate workpieces can be placed in a stored position; and
   a transfer assembly to engage an elongate workpiece in the stored position and selectively deliver an elongate workpiece engaged by the transfer assembly selectively to one of the first and second locations, the transfer assembly comprising first and second inclined surfaces which guide elongate workpieces moving under gravitational forces along the first and second inclined surfaces between the supply toward the first and second machining units.

2. The system for processing elongate workpieces according to claim 1 wherein the transfer assembly comprises a shuttle assembly which is vertically movable between a first position from where an elongate workpiece on the shuttle assembly can be delivered to the first location and a second position from where an elongate workpiece on the shuttle assembly can be delivered to the second location.

3. The system for processing elongate workpieces according to claim 2 wherein the transfer assembly further comprises a first loading unit for directing elongate workpieces from the stored position to a holding position on the shuttle assembly.

4. The system for processing elongate workpieces according to claim 3 wherein the shuttle assembly comprises an elongate workpiece holder that is repositionable between a conveying position and a first transfer position.

5. The system for processing elongate workpieces according to claim 4 wherein the first loading unit comprises a pickup shoulder that is movable between a pickup position and a release position, the pickup shoulder engaging an elongate workpiece in the stored position and causing movement of an elongate workpiece from the stored position toward the elongate workpiece holder as an incident of the pickup shoulder moving from the pickup position toward the release position.

6. The system for processing elongate workpieces according to claim 5 wherein the shoulder is pivotable between the pickup and release positions.

7. The system for processing elongate workpieces according to claim 5 wherein the supply unit comprises an inclined feeding surface along which elongate workpieces are urged by gravitational force toward a pickup location.

8. The system for processing elongate workpieces according to claim 7 wherein the first loading unit further comprises a blocking surface to block movement of an elongate workpiece into the pickup location as the pickup shoulder is moved with a workpiece from the pickup position into the release position.

9. The system for processing elongate workpieces according to claim 2 further comprising a guide assembly for guiding vertical movement of the shuttle assembly between the first and second positions.

10. The system for processing elongate workpieces according to claim 1 further comprising a pusher assembly for directing a workpiece into operative relationship with the first machining unit.

11. The system for processing elongate workpieces according to claim 10 wherein the first machining unit has a rotary operating axis and the pusher assembly pushes an elongate workpiece in a line that is substantially coincident with the rotary operating axis.

12. The system for processing elongate workpieces according to claim 1 further comprising at least one elongate workpiece in a stored position on the first supply unit.

13. A system for processing elongate workpieces, said system comprising:
 a first machining unit for performing a first processing operation on an elongate workpiece that is situated at a first location;
 a second machining unit for performing a second processing operation on an elongate workpiece that is situated at a second location that is vertically spaced from the first location;
 a first supply unit on which a plurality of elongate workpieces can be placed in a stored position; and
 a transfer assembly to engage an elongate workpiece in the stored position and selectively deliver an elongate workpiece engaged by the transfer assembly selectively to one of the first and second locations,
 wherein the transfer assembly comprises a shuttle assembly which is vertically movable between a first position from where an elongate workpiece on the shuttle assembly can be delivered to the first location and a second position from where an elongate workpiece on the shuttle assembly can be delivered to the second location,
 wherein the transfer assembly comprises a first loading unit for directing elongate workpieces from the stored position to a holding position on the shuttle assembly,
 wherein the shuttle assembly comprises an elongate workpiece holder that is repositionable between a conveying position and a first transfer position,
 the system further comprising a first guide surface to which an elongate workpiece in the holding position can be delivered and guided toward the first location with the shuttle assembly in the first position.

14. The system for processing elongate workpieces according to claim 13 wherein the first guide surface declines toward the first location.

15. The system for processing elongate workpieces according to claim 14 wherein the elongate workpiece holder comprises at least one surface which defines a receptacle for an elongate workpiece in the holding position with the workpiece holder in the conveying position and which guides movement of an elongate workpiece in the holding position onto the first guide surface as an incident of the workpiece holder changing from the conveying position toward the first transfer position.

16. The system for processing elongate workpieces according to claim 15 wherein the elongate workpiece holder is pivotable between the conveying position and the first transfer position.

17. The system for processing elongate workpieces according to claim 15 further comprising a third machining unit for performing a third processing operation on an elongate workpiece that is at a third location spaced from the first and second locations.

18. The system for processing elongate workpieces according to claim 17 wherein the elongate workpiece holder is repositionable to a second transfer position, there is a third guide surface and the at least one surface on the elongate workpiece holder guides movement of an elongate workpiece in the holding position onto the third guide surface as an incident of the workpiece holder changing from the conveying position toward the second transfer position.

19. The system for processing elongate workpieces according to claim 18 wherein the first and third locations are at substantially the same height.

20. The system for processing elongate workpieces according to claim 14 wherein there is a stop shoulder at the first guide surface to which an elongate workpiece moving downwardly along the first guide surface abuts to maintain an elongate workpiece which has moved downwardly along the first guide surface consistently in a predetermined position against the stop shoulder.

21. A system for processing elongate workpieces, said system comprising:
 a first machining unit for performing a first processing operation on an elongate workpiece that is situated at a first location;
 a second machining unit for performing a second processing operation on an elongate workpiece that is situated at a second location that is vertically spaced from the first location;
 a first supply unit on which a plurality of elongate workpieces can be placed in a stored position; and
 a transfer assembly to engage an elongate workpiece in the stored position and selectively deliver an elongate workpiece engaged by the transfer assembly selectively to one of the first and second locations,
 wherein the transfer assembly comprises a first guide surface which is inclined so as to guide elongate workpieces from the first supply unit toward the first location and a second guide surface which is inclined so as to guide elongate workpieces from the first supply unit toward the second location.

22. The system for processing elongate workpieces according to claim 21 wherein the transfer assembly further comprises a shuttle assembly which is vertically movable between a first position from where an elongate workpiece on the shuttle assembly can be delivered to against the first guide surface for movement under gravitational force toward the first location and a second position from where an elongate workpiece on the shuttle assembly can be delivered to against the second guide surface for movement thereagainst under gravitational force toward the second location.

23. A method for processing elongate workpieces, said method comprising the steps of:

storing a plurality of elongate workpieces on a first supply unit;

delivering a first elongate workpiece from the first supply unit to a first location by causing the first elongate workpiece to move under gravitational force between the first supply unit toward the first location;

performing a first processing operation on the first elongate workpiece at the first location;

delivering a second elongate workpiece from the first supply unit to a second location that is vertically spaced from the first location by causing the second elongate workpiece to move under gravitational force from the first supply unit toward the second location; and performing a second processing operation on the second elongate workpiece at the second location.

24. The method for processing elongate workpieces according to claim 23 wherein the step of storing a plurality of elongate workpieces comprises storing a plurality of workpieces on an inclined feeding surface so that the plurality of elongate workpieces are urged by gravitational forces into an accumulated state one against the other.

25. The method for processing elongate workpieces according to claim 24 further comprising the step of guiding the first elongate workpiece from the first supply unit to a first workpiece holder.

26. A method for processing elongate workpieces, said method comprising the steps of:

storing a plurality of elongate workpieces on a first supply unit;

delivering a first elongate workpiece from the first supply unit to a first location;

performing a first processing operation on the first elongate workpiece at the first location;

delivering a second elongate workpiece from the first supply unit to a second location that is vertically spaced from the first location;

performing a second processing operation on the second elongate workpieces at the second location;

removing the first elongate workpiece from the first supply unit; and blocking removal of another of the plurality of elongate workpieces from the first supply unit.

27. A method for processing elongate workpieces, said method comprising the steps of:

storing a plurality of elongate workpieces on a first supply unit;

delivering a first elongate workpiece from the first supply unit to a first location;

performing a first processing operation on the first elongate workpiece at the first location;

delivering a second elongate workpiece from the first supply unit to a second location that is vertically spaced from the first location; and performing a second processing operation on the second elongate workpiece at the second location, wherein the step of delivering the first elongate workpiece comprises delivering the first elongate workpiece to against a first inclined guide surface so that the first elongate workpiece moves against the first inclined guide surface under the force of gravity toward the first location.

28. The method for processing elongate workpieces according to claim 27 wherein the step of delivering the second elongate workpiece comprises delivering the second elongate workpiece to against a second inclined guide surface so that the second elongate workpiece moves against the second inclined guide surface under the force of gravity toward the second location.

29. A method for processing elongate workpieces, said method comprising the steps of:

storing a plurality of elongate workpieces on a first supply unit;

delivering a first elongate workpiece from the first supply unit to a first location;

performing a first processing operation on the first elongate workpiece at the first location;

delivering a second elongate workpiece from the first supply unit to a second location that is vertically spaced from the first location;

performing a second processing operation on the second elongate workpiece at the second location, wherein the step of storing a plurality of elongate workpieces comprises storing a plurality of workpieces on an inclined feeding surface so that the plurality of elongate workpieces are urged by gravitational forces into an accumulated state one against the other;

guiding the first elongate workpiece from the first supply unit to a first workpiece holder; and repositioning the first workpiece holder to thereby direct the first elongate workpiece from the first workpiece holder toward the first location.

30. The method for processing elongated workpieces according to claim 29 further comprising the steps of directing a third elongated workpiece from the supply unit to the first workpiece holder and repositioning the first workpiece holder to thereby direct the third elongated workpiece from the first workpiece holder toward a third location.

31. The method for processing elongated workpieces according to claim 30 further comprising the steps of delivering the third elongated workpiece to the third location and at the third location performing a third processing step on the third elongated workpiece.

32. The method for processing elongated workpieces according to claim 29 further comprising the steps of directing the first elongated workpiece past the first workpiece holder to a second workpiece holder and repositioning the second workpiece holder to thereby direct the first elongated workpiece from the second workpiece holder toward the first location.

33. The method for processing elongated workpieces according to claim 32 further comprising the step of placing the first workpiece holder into a release state and guiding a third elongated workpiece through the first workpiece holder to a holding position on the second workpiece holder.

34. The method for processing elongated workpieces according to claim 33 further comprising the steps of repositioning the second workpiece holder to thereby direct the third elongated workpiece toward a third location.

35. A method for processing elongate workpieces, said method comprising the steps of:

storing a plurality of elongate workpieces on a first supply unit;

delivering a first elongate workpiece from the first supply unit to a first location;

performing a first processing operation on the first elongate workpiece at the first location;

delivering a second elongate workpiece from the first supply unit to a second location that is vertically spaced from the first location;

performing a second processing operation on the second elongate workpiece at the second location, wherein the step of storing a plurality of elongate workpieces comprises storing a plurality of workpieces on an inclined feeding surface so that the plurality of elongate workpieces are urged by gravitational forces into an accumulated state one against the other;

guiding the first elongate workpiece from the first supply unit to a first workpiece holder;

directing a third elongate workpiece past the first workpiece holder to a second workpiece holder; and repositioning the second workpiece holder to thereby direct the third elongate workpiece from the second workpiece holder toward a third location.

36. A method for processing elongate workpieces, said method comprising the steps of:

storing a plurality of elongate workpieces on a first supply unit;

delivering a first elongate workpiece from the first supply unit to a first location;

performing a first processing operation on the first elongate workpiece at the first location;

delivering a second elongate workpiece from the first supply unit to a second location that is vertically spaced from the first location;

performing a second processing operation on the second elongate workpiece at the second location, wherein the step of storing a plurality of elongate workpieces comprises storing a plurality of workpieces on an inclined feeding surface so that the plurality of elongate workpieces are urged by gravitational forces into an accumulated state one against the other;

guiding the first elongate workpiece from the first supply unit to a first workpiece holder;

placing the first workpiece holder in a holding state directing the first elongate workpiece into a holding position on the first workpiece holder;

changing the first workpiece holder from the holding state into a release state; and repositioning the first workpiece holder so that with the first workpiece holder in the release state the first elongate workpiece is directed toward the first location.

* * * * *